March 18, 1952 — A. L. LEE — 2,589,827
LOADING MACHINE
Filed April 10, 1944 — 15 Sheets-Sheet 1
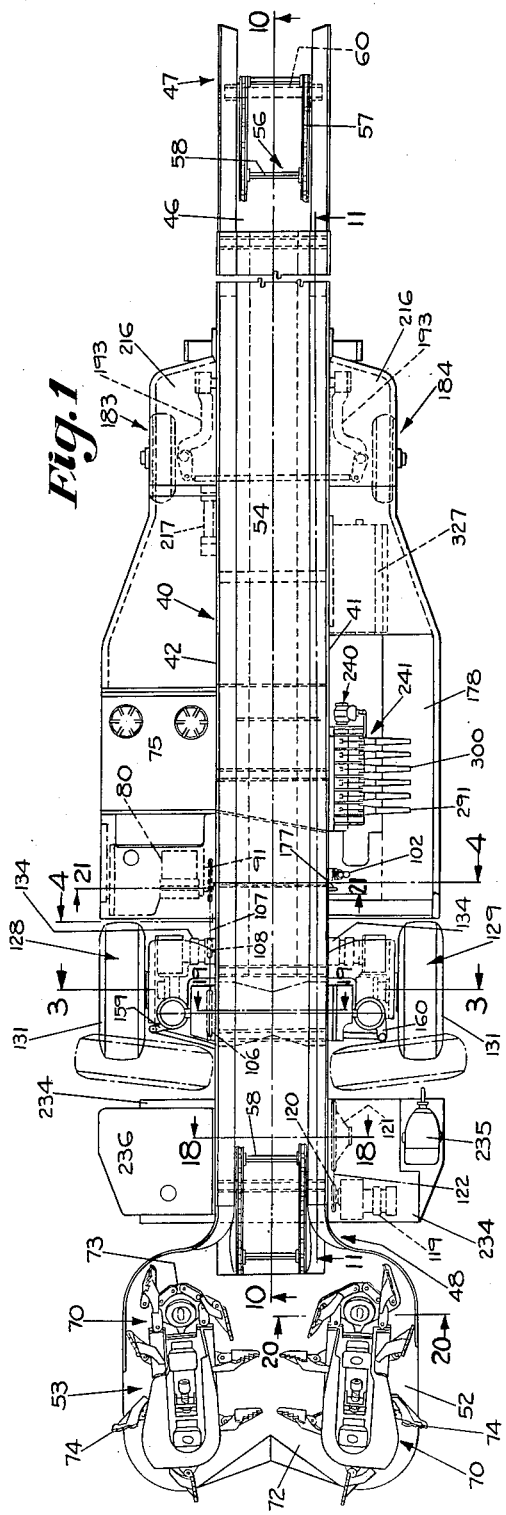
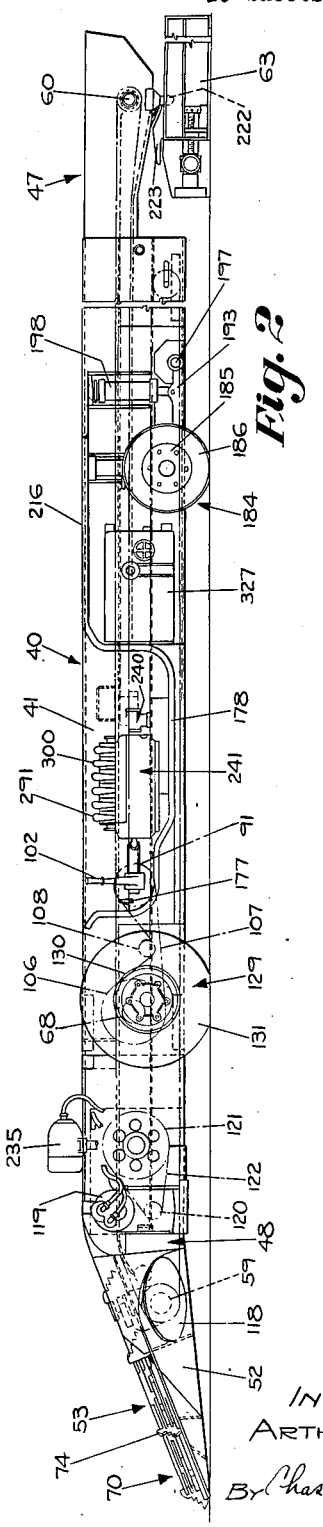
INVENTOR:
ARTHUR L. LEE
By Chas. M. Nissen,
ATT'Y March 18, 1952   A. L. LEE   2,589,827
LOADING MACHINE
Filed April 10, 1944   15 Sheets-Sheet 2

INVENTOR:
ARTHUR L. LEE,
By Chas. M. Nissen,
ATT'Y.

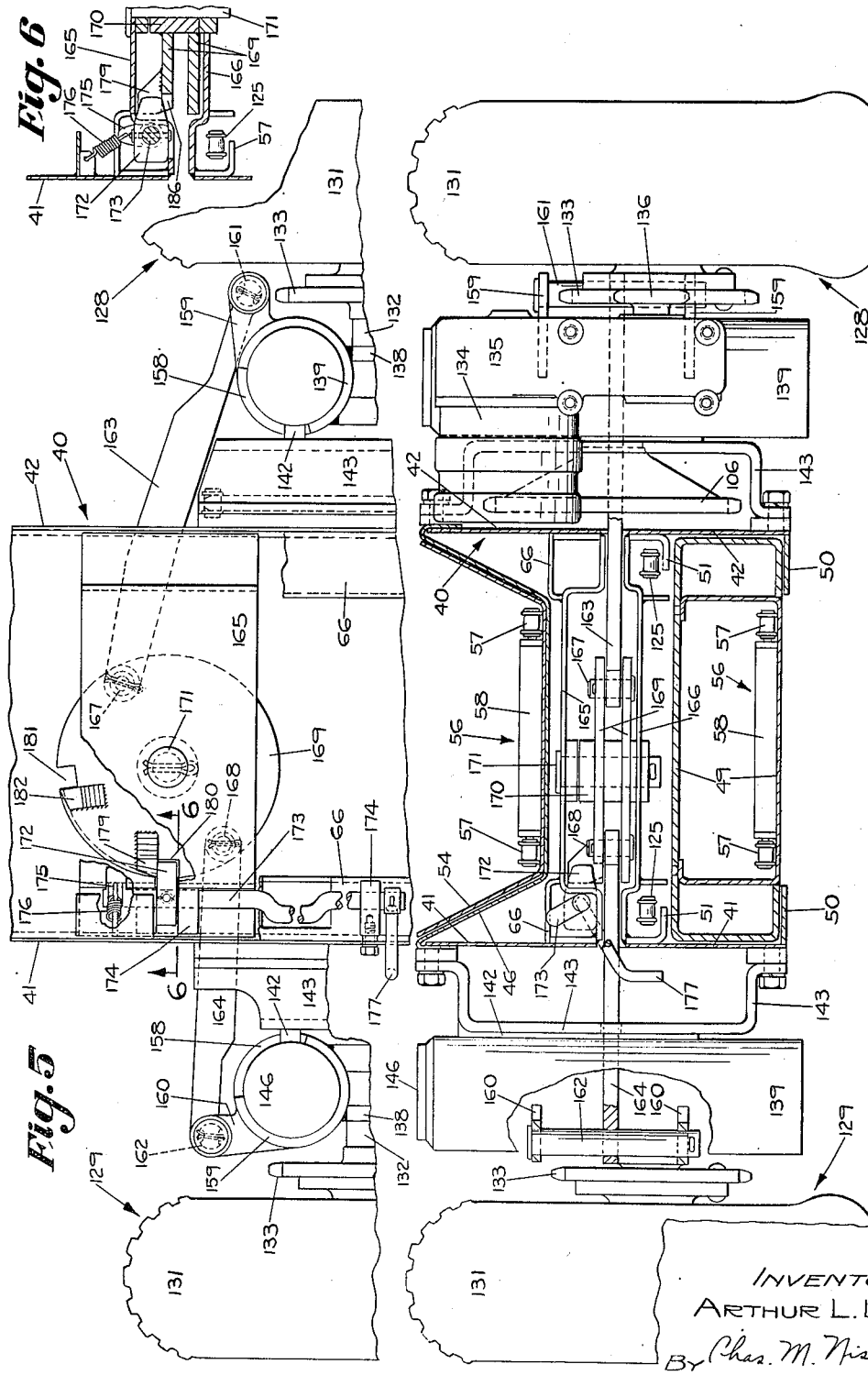

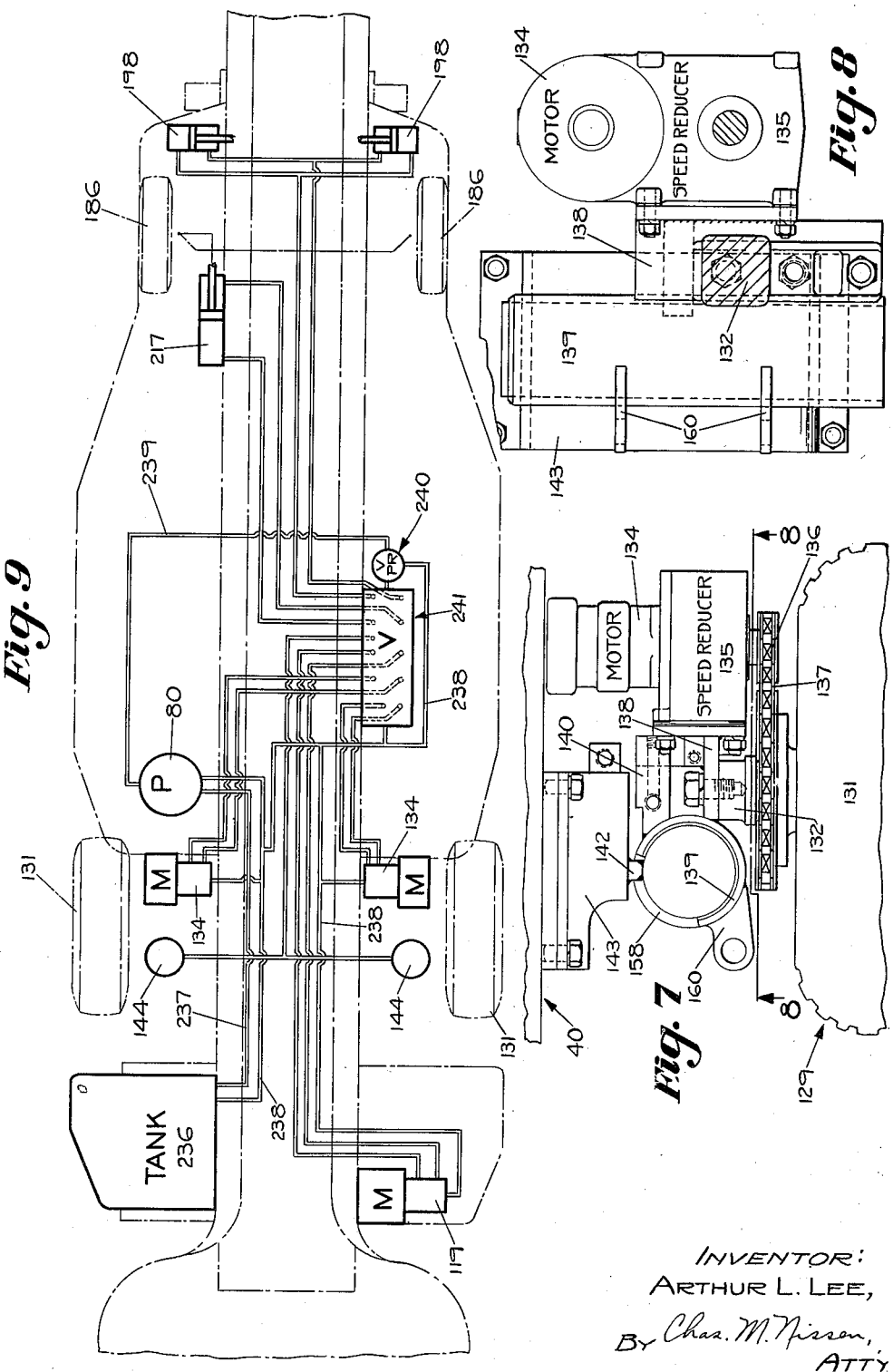

March 18, 1952    A. L. LEE    2,589,827
LOADING MACHINE
Filed April 10, 1944    15 Sheets-Sheet 5
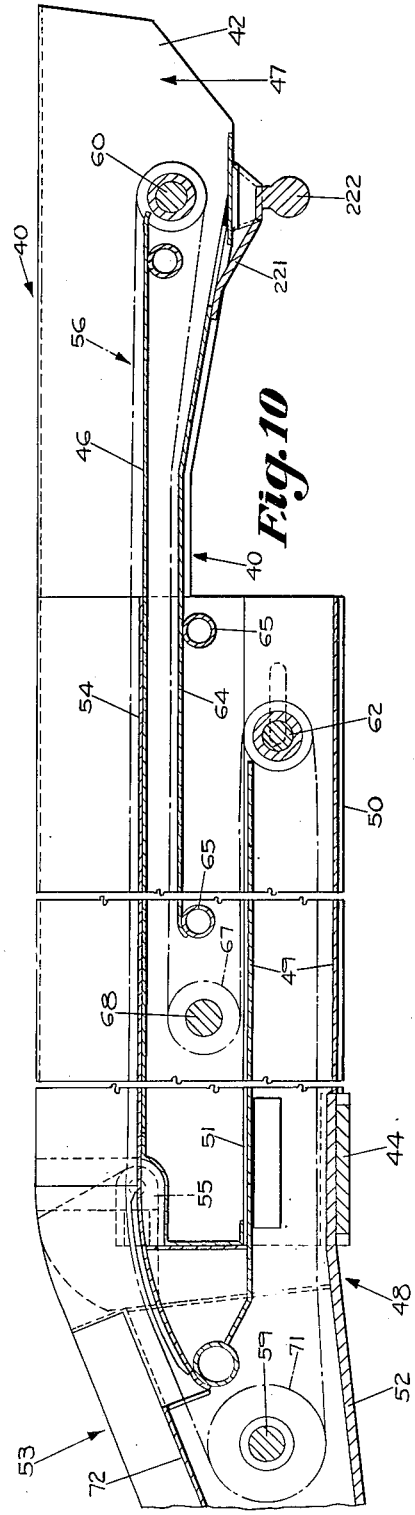
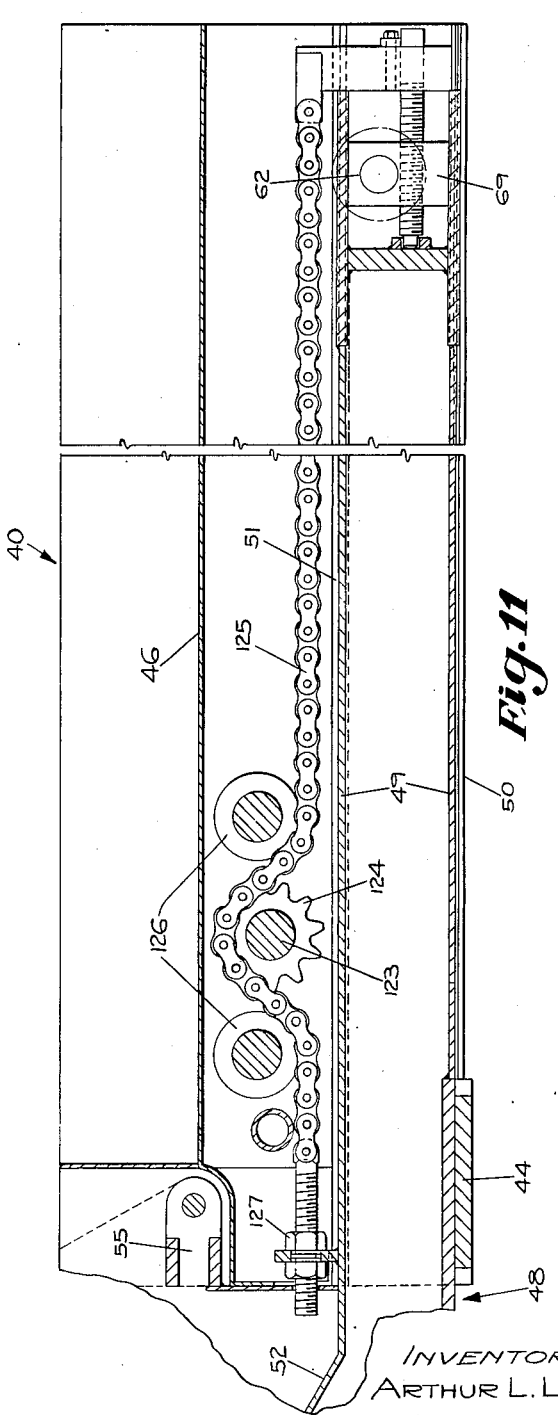
INVENTOR:
ARTHUR L. LEE,
By Chas. M. Nissen,
ATT'Y.

March 18, 1952        A. L. LEE        2,589,827

LOADING MACHINE

Filed April 10, 1944        15 Sheets-Sheet 6

INVENTOR:
ARTHUR L. LEE,
By Chas. M. Nissen,
ATTY.

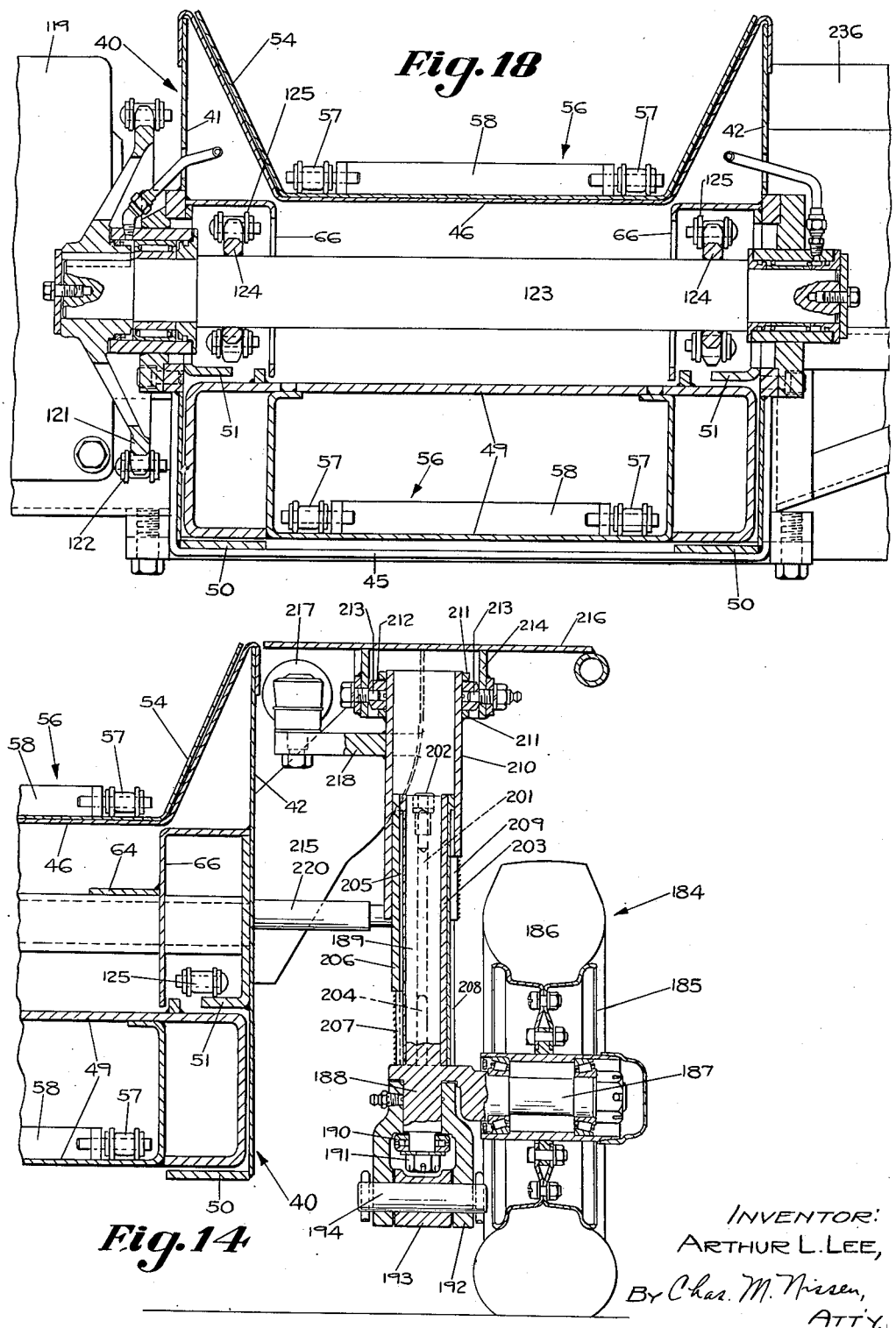

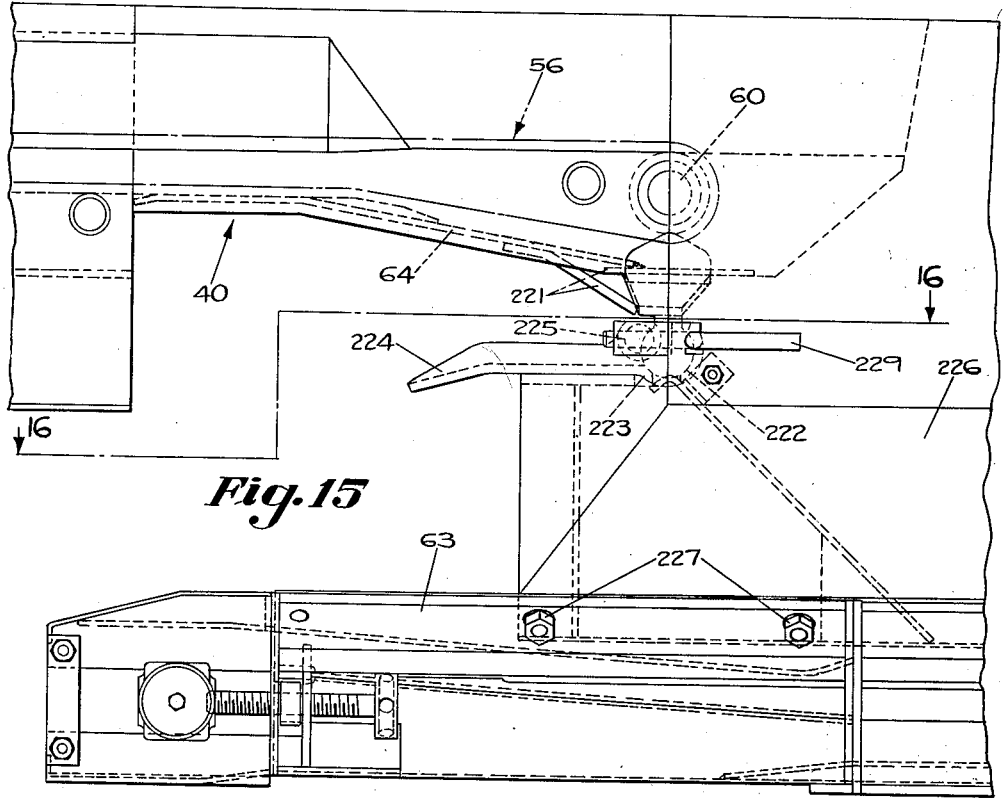
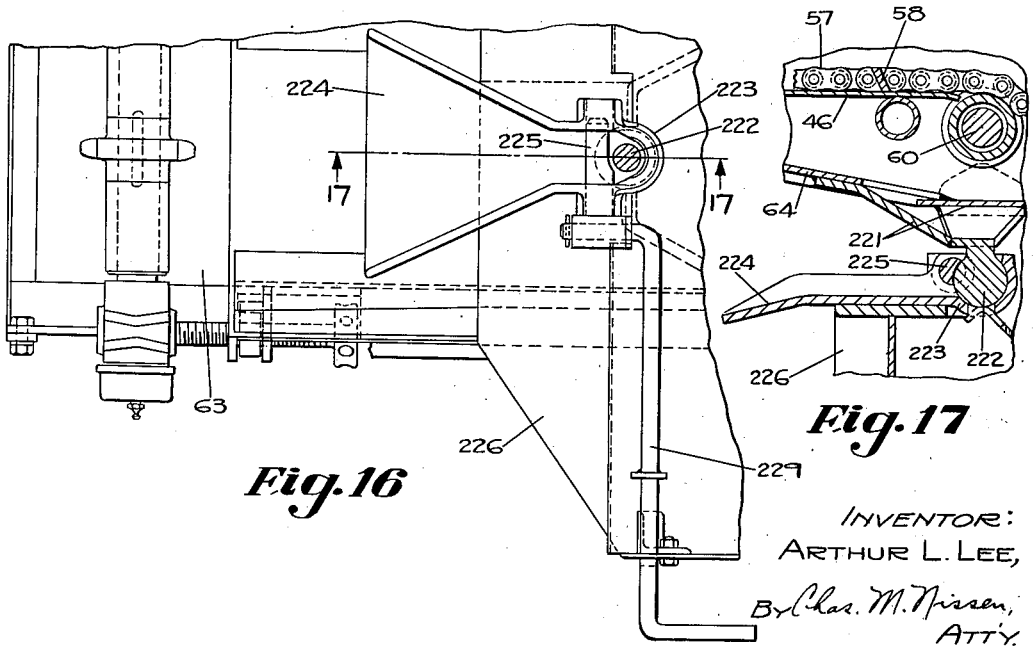

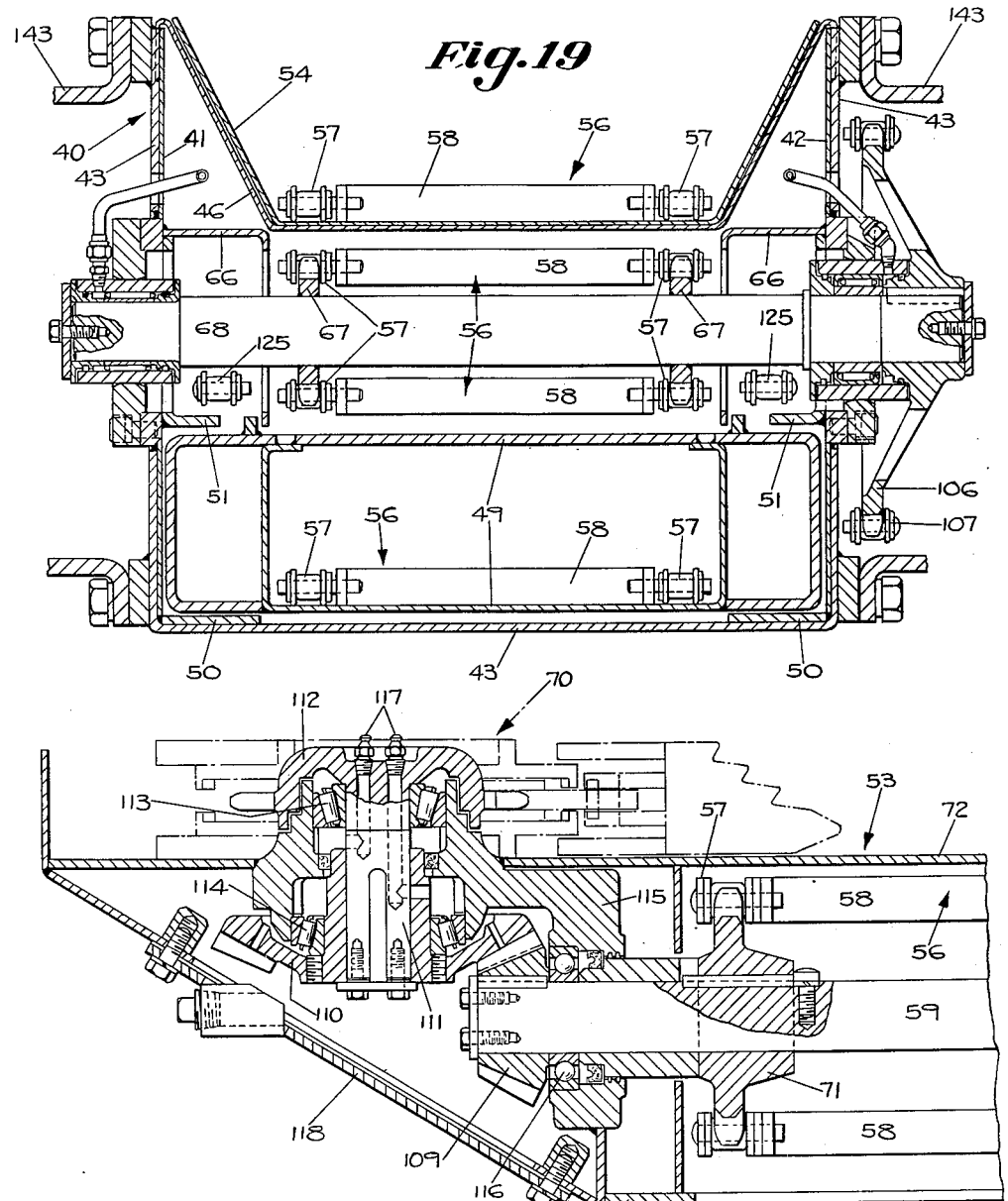

March 18, 1952  A. L. LEE  2,589,827
LOADING MACHINE
Filed April 10, 1944  15 Sheets-Sheet 10
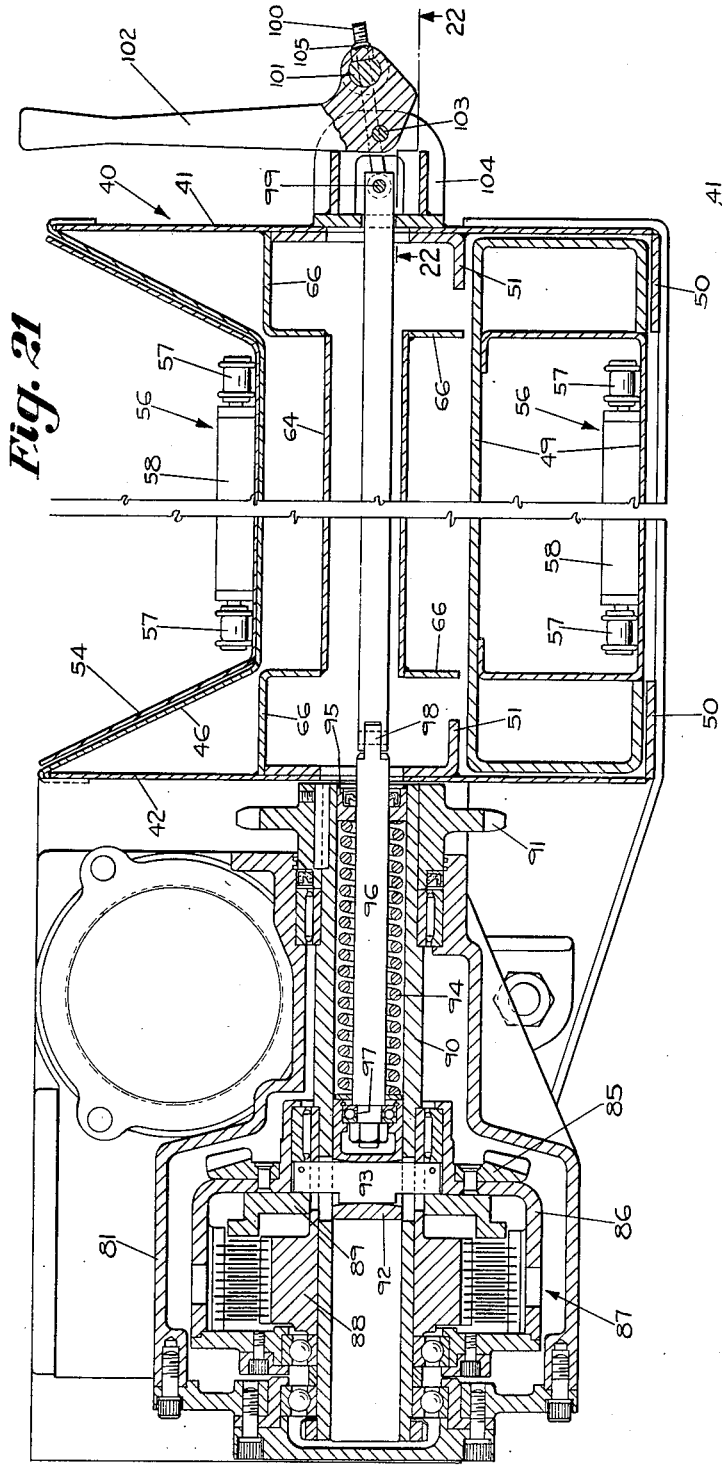
INVENTOR:
ARTHUR L. LEE,
By Chas. M. Nissen,
ATTY March 18, 1952  A. L. LEE  2,589,827
LOADING MACHINE Filed April 10, 1944  15 Sheets-Sheet 11

INVENTOR:
ARTHUR L. LEE,
By Chas. M. Niesen,
ATTY.

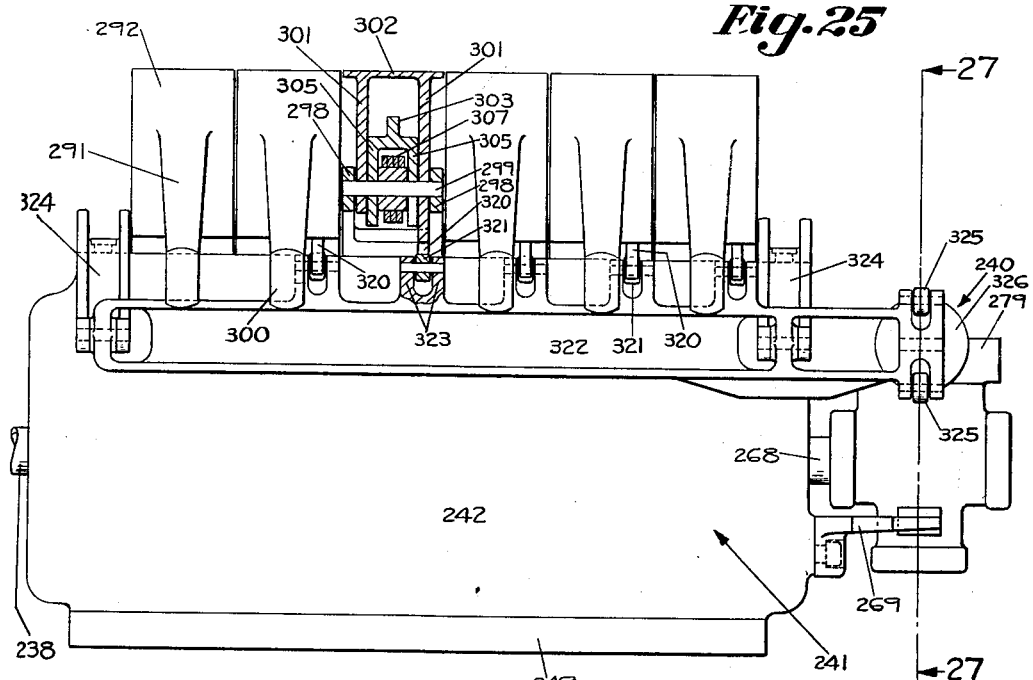
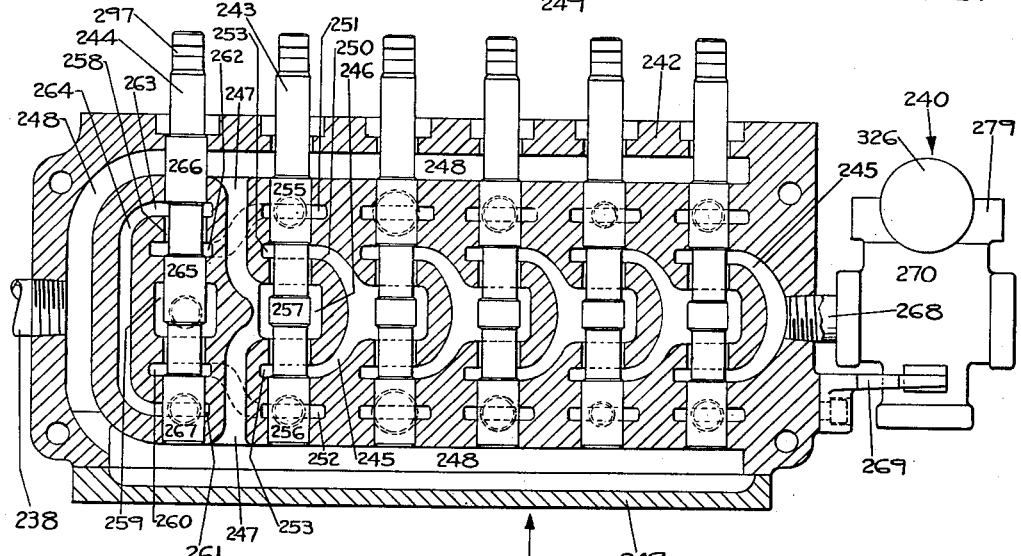

March 18, 1952     A. L. LEE     2,589,827
LOADING MACHINE
Filed April 10, 1944     15 Sheets-Sheet 13
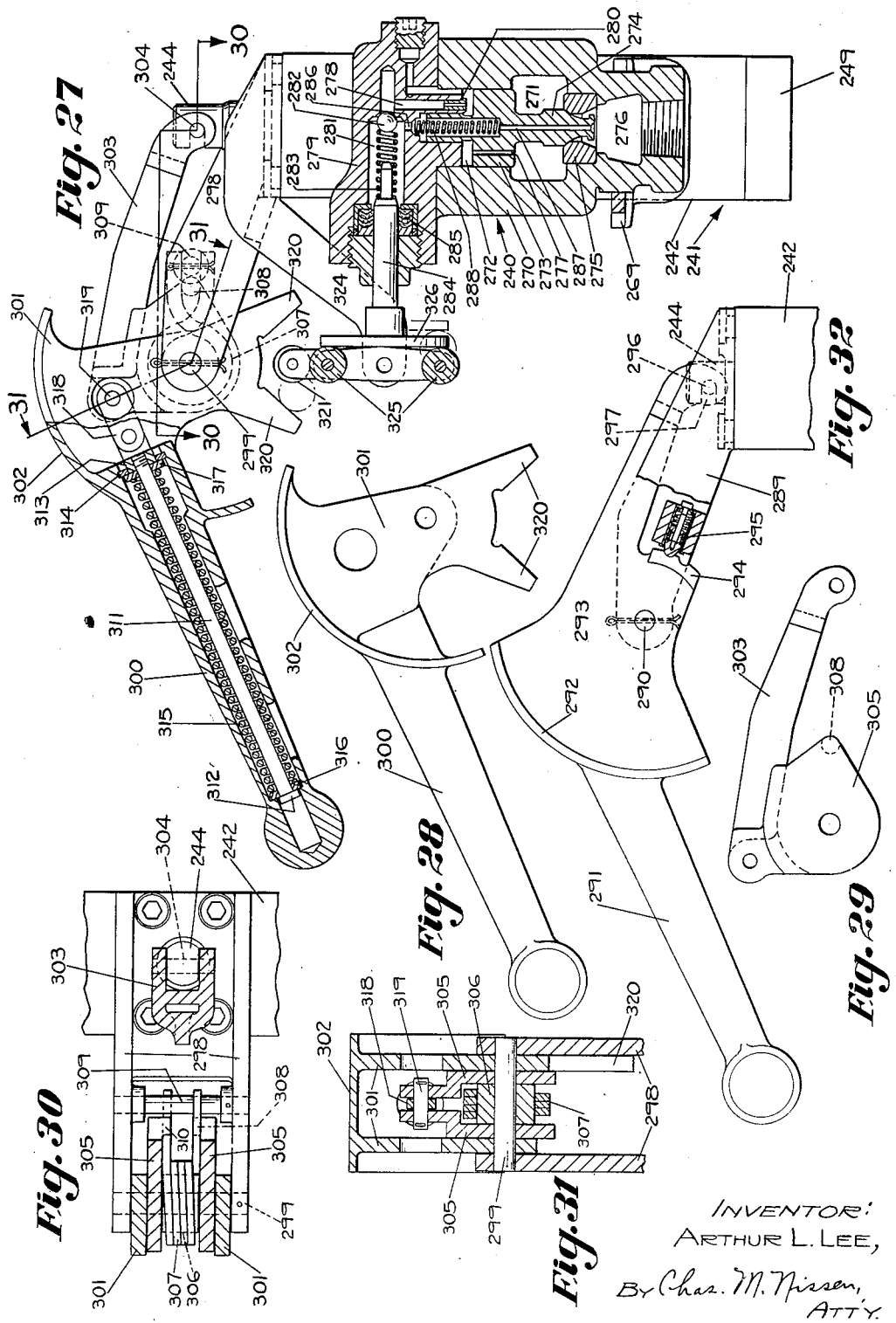
INVENTOR:
ARTHUR L. LEE,
By Chas. M. Nissen,
ATT'Y.

March 18, 1952 A. L. LEE 2,589,827
LOADING MACHINE
Filed April 10, 1944 15 Sheets-Sheet 14

INVENTOR:
ARTHUR L. LEE,
By Chas. M. Nissen,
ATT'Y

March 18, 1952     A. L. LEE     2,589,827
LOADING MACHINE
Filed April 10, 1944     15 Sheets-Sheet 15
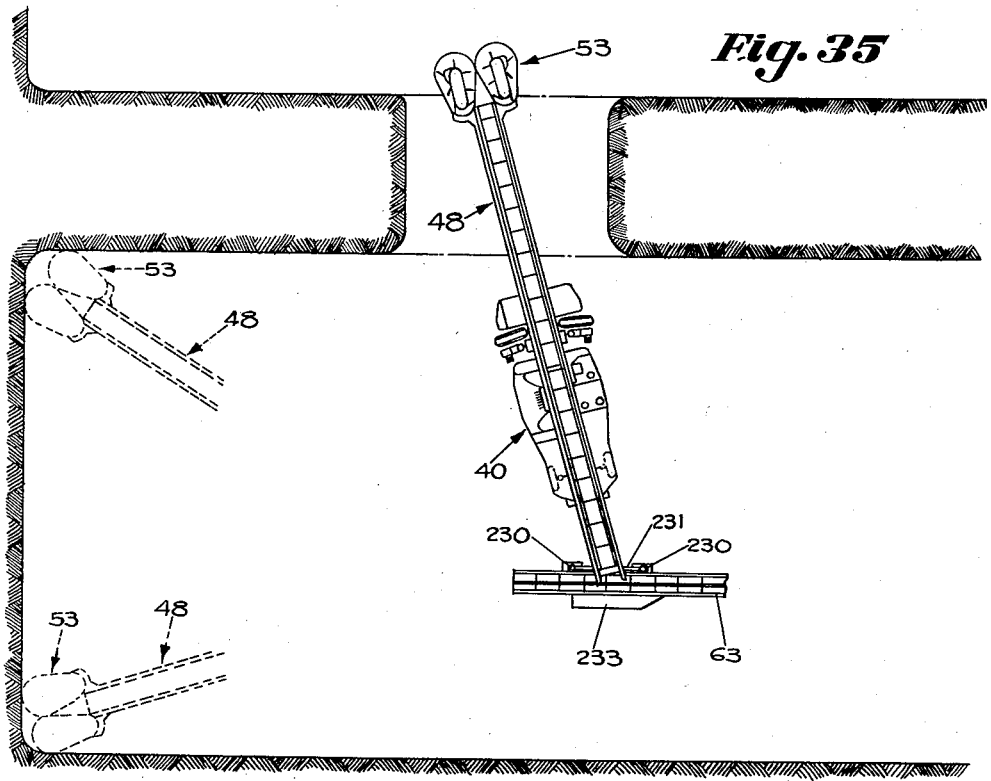
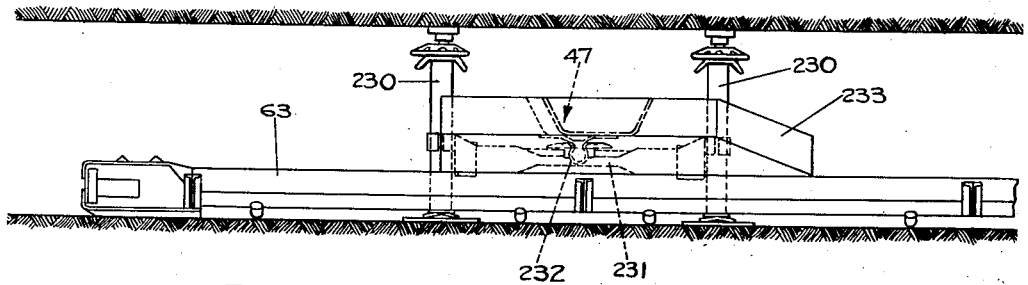
INVENTOR:
ARTHUR L. LEE,
By Chas. M. Nissen,
Att'y Patented Mar. 18, 1952

2,589,827

UNITED STATES PATENT OFFICE 2,589,827

LOADING MACHINE

Arthur L. Lee, Columbus, Ohio, assignor, by mesne assignments, to The Jeffrey Manufacturing Company, a corporation of Ohio Application April 10, 1944, Serial No. 530,361

15 Claims. (Cl. 198—8)

This invention relates to a loading machine and to certain sub-combinations of elements found in such machine many of which while specifically designed for a loading machine are in certain broad aspects applicable to other types of devices.

An object of the invention is to provide an improved loading machine capable of efficient and high rate loading of coal particularly from a mine room into a room conveyor.

A further object of the invention is to provide an improved self-contained power-operated self-loading type of loading machine.

A more specific object of the invention is to provide a loading machine employing a telescoping conveyor having an endless conveyor mechanism and provided with a gathering head which may be extended and forced into a pile of loose or semi-compact coal which coal is gathered by the head and delivered to the conveyor which discharges it into a receiving conveyor at a fixed position.

A further object of the invention is to provide an improved frontal attack type of self-loading machine adapted to swing about a fixed pivot point adjacent its discharge end in a substantially horizontal plane.

A further object of the invention is to provide a self-contained loading machine having both traction and steering wheels, the machine being provided with means to lift the steering wheels and to swing the traction wheels so that the entire machine may be swung about an upright pivot joint by said traction means.

A further object of the invention is to provide a self-loading machine of low overall height including a conveyor which extends between the traction and steering wheels and has an overall height not in excess of that of one of said wheels.

A further object of the invention is to provide loading apparatus including an endless conveyor and self-loading means in which the device is pivoted for swinging movement about an upright axis adjacent the discharge end thereof which provides an abutment against which the feeding head may be pushed rectilinearly into a pile of shot down or semi-compact coal while coal is gathered and delivered over the discharge end of said loader.

A further object of the invention is to provide a loader with pneumatic tires or wheels in which the overall height of the loader does not exceed the outside diameter of one of said tires or wheels.

A further object of the invention is to provide an improved mounting between the traction wheels and the main frame which preferably also provides for swinging of the traction wheels about the upright axis and which also preferably further provides for vertical adjustment of said wheels relative to said main frame.

A further object of the invention is to provide a device of the above-mentioned type in which traction wheels are provided to move the device longitudinally or, in other words, in which the wheels travel in parallel paths and also in which the wheels are adjustable preferably alternately about upright axes so that the wheels are substantially in tandem though their axes are along the arc of a circle and capable of swinging the machine about an upright pivotal axis preferably located adjacent the discharge end of the loader.

A further and more specific object of my invention is to provide improved linkage means for controlling the traction wheels and locking them to move in either parallel or tandem relation.

A further object of the invention is to provide an improved relation of parts including a pivotal and vertically adjustable wheel and motor driving mechanism therefor.

Another object of the invention is to provide a loader including a hydraulic system in which there are hydraulic motors for operating traction wheels, the system providing for reverse operation of the traction wheels in parallel or in tandem relation.

In certain broader aspects of the invention an object of the invention is to provide a hydraulic system capable of operating a pair of hydraulic motors together in a like manner or more specifically in the same direction and also in an unlike manner or more specifically in reverse direction and also preferably to be able to reverse the direction of operation of said motors under both conditions.

A further object of the invention is to provide an improved control valve having control passageways and valve members adapted for use in a system to carry out the function in the first preceding object.

Another object of the invention is to provide a mining machine with a hydraulic system including related control and characteristic controlling valves the characteristic being controlled being in the specific instance the fluid pressure which is delivered to the hydraulic motors, the arrangement providing for control first of the connection of the motors to the hydraulic system and thereafter a progressive variation of the characteristic of the fluid or specifically the pressure.

In a more specific aspect of the invention a single operating lever is employed to carry out these functions and in a broader aspect of the invention it relates to such a hydraulic system for general application.

A further object of the invention is to provide an improved valve arrangement in which a single operating lever controls two types of valves one of which is capable of varying a characteristic of the hydraulic fluid such as the pressure and this preferably in a progressive manner as the operating lever is adjusted.

A further object of the invention is to provide a loader with improved steering wheel mechanism which may be adjusted vertically with respect to the loader main frame.

Still another object of the invention is to provide improved means for connecting the discharge end of the loader preferably to the room conveyor so that the loader may swing about an upright axis, the connection preferably being an improved ball and socket type device.

Another object of the invention is to provide a compact arrangement of parts for driving the several elements of a loader including an electric motor, a clutch, and control means therefor, as well as a hydraulic pump driven by the motor for supplying hydraulic fluid under pressure which may be utilized by the hydraulic system used on the motor to carry out the various functions.

Still another object of the invention is to provide an improved loader having a particular arrangement in which there is a telescoping type conveyor including a continuous chain conveyor mechanism which is driven by a motor, chains also being employed with other mechanism to drive gathering mechanism at the head end of said conveyor.

Numerous other and more specific as well as broader aspects of the invention will be evident from the detailed description which follows and from certain broad as well as detailed claims forming a part of this specification.

In the accompanying drawings,

Fig. 1 is a plan view of the loading machine comprising my invention;

Fig. 2 is a side elevational view of the machine with certain parts removed;

Fig. 4 is a sectional elevational view taken generally on the line 4—4 of Fig. 1 looking in the direction of the arrows, certain parts being broken away to show others in detail;

Fig. 5 is a plan view of the locking mechanism shown in Fig. 4 with the conveyor trough and chain mechanism removed and with other parts broken away in the interest of clarity;

Fig. 6 is a detailed sectional view taken on the line 6—6 of Fig. 5 looking in the direction of the arrows;

Fig. 7 is a plan view with parts omitted showing one of the front or traction wheels;

Fig. 8 is a sectional elevational view taken on the line 8—8 of Fig. 7 looking in the direction of the arrows;

Fig. 9 is a schematic piping diagram of the hydraulic system of the machine;

Fig. 10 is a sectional elevational view taken on the line 10—10 of Fig. 1 looking in the direction of the arrows with the machine broken off in parts to reduce the length of the view;

Fig. 11 is a sectional view taken on the line 11—11 of Fig. 1 looking in the direction of the arrows, the device being broken in two to shorten the length of the view;

Fig. 14 is a sectional elevational view taken on the line 14—14 of Fig. 13, looking in the direction of the arrows;

Fig. 15 is an enlarged side elevational view of the discharge end of the conveyor;

Fig. 16 is a partial plan view showing a part in section and taken on the line 16—16 of Fig. 15 looking in the direction of the arrows;

Fig. 17 is an enlarged detailed sectional elevational view taken on the line 17—17 of Fig. 16 looking in the direction of the arrows;

Fig. 18 is a sectional view taken on the line 18—18 of Fig. 1 looking in the direction of the arrows;

Fig. 19 is a sectional view taken on the line 19—19 of Fig. 1 looking in the direction of the arrows;

Fig. 20 is a sectional view taken on the line 20—20 of Fig. 1 looking in the direction of the arrows;

Fig. 21 is a sectional view taken on the line 21—21 of Fig. 1 looking in the direction of the arrows;

Fig. 22 is a sectional detail taken on the line 22—22 of Fig. 21, looking in the direction of the arrows;

Fig. 25 is an elevational view of the hydraulic valve assembly with the operating mechanism of one of the valve operating levers shown in section;

Fig. 26 is a sectional elevational view of the bank of valves of Fig. 25 with the pressure control valve shown in elevation;

Fig. 27 is a sectional view taken on the line 27—27 of Fig. 25 showing the pressure valve in section and also showing in section a portion of one of the operating levers;

Fig. 28 is a side elevational view of one of the operating levers of the valve assemblies of Figs. 25 and 27.

Fig. 29 is an elevational view of one of the parts or members of the valve assembly of Figs. 25 and 27;

Fig. 30 is a sectional view taken on the line 30—30 of Fig. 27 looking in the direction of the arrows;

Fig. 31 is a sectional view taken on the line 31—31 of Fig. 27 looking in the direction of the arrows;

Fig. 32 is a side elevational view with parts in section showing the last or left hand valve of the valve assembly of Figs. 25—27 which has a different function from the other valves;

Figure 34:
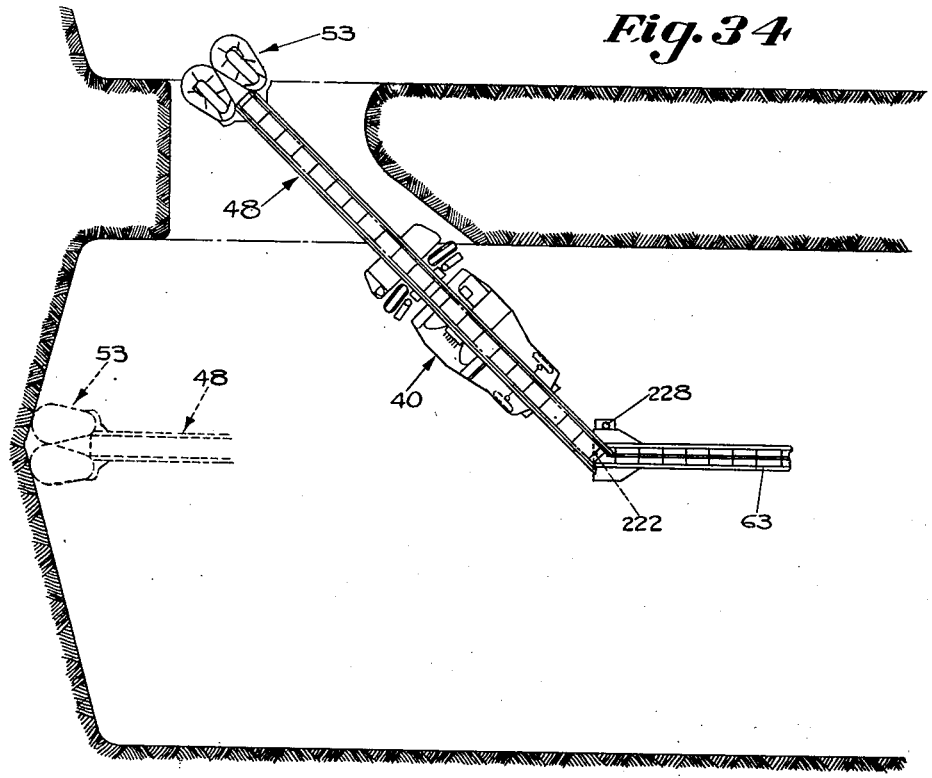
Fig. 34 is a view similar to Fig. 33 but showing the loader in its extended position after loading out a diagonal break-through in a mine pillar.

Fig. 35 is another view similar to Fig. 34 except that the pillar break-through has parallel walls and is more removed from the room face. In addition a different pivotal mounting for the loader is provided so that it discharges over the side of the conveyor and coal is guided thereto by a chute; and Fig. 36 is an elevational view of the apparatus of Fig. 35 showing particularly the jacks and pivotal support mechanism for the loader together with the guiding chute and associated room conveyor.

Before describing in detail the loader of my invention it may be stated that the loader is designed particularly to be capable of operation in very low coal as for example in coal seams having a height from 24 to 36 inches, though the machine may be used in a coal seam of any greater height.

The machine is fundamentally a frontal attack type of machine, that is, the principal loading takes place by rectilinear forward feed movement of the gathering mechanism though some loading may very well take place while swinging the machine about a fixed pivotal axis which is provided adjacent its rear or discharge end and preferably by means including one or more roof jacks as hereinafter described more completely.

Another important characteristic of the loader is that the discharge position is maintained fixed while the gathering mechanism operates over a very wide range due to the fact that it may be swung in a horizontal plane as well as extended forwardly. It is, of course, evident that while the discharge position is fixed for any arrangement, its position may be moved about in a mine room should circumstances warrant it, though in general it is possible to lay the room conveyor associated with the loader generally along the center line of the mine room and not move it until a shooting of coal along the mine face has been entirely removed.

The device is completely self-contained and may be transported under its own power by an operator who may ride on it, thus providing for its quick and ready removal from one mine room to another or to different locations in a single mine room. Furthermore, the device is fed under power both to feed the gathering head rectilinearly and to swing it laterally, rectilinear feeding being provided consistent with a uniform system of discharge by telescoping conveyor parts.

Figure 3:
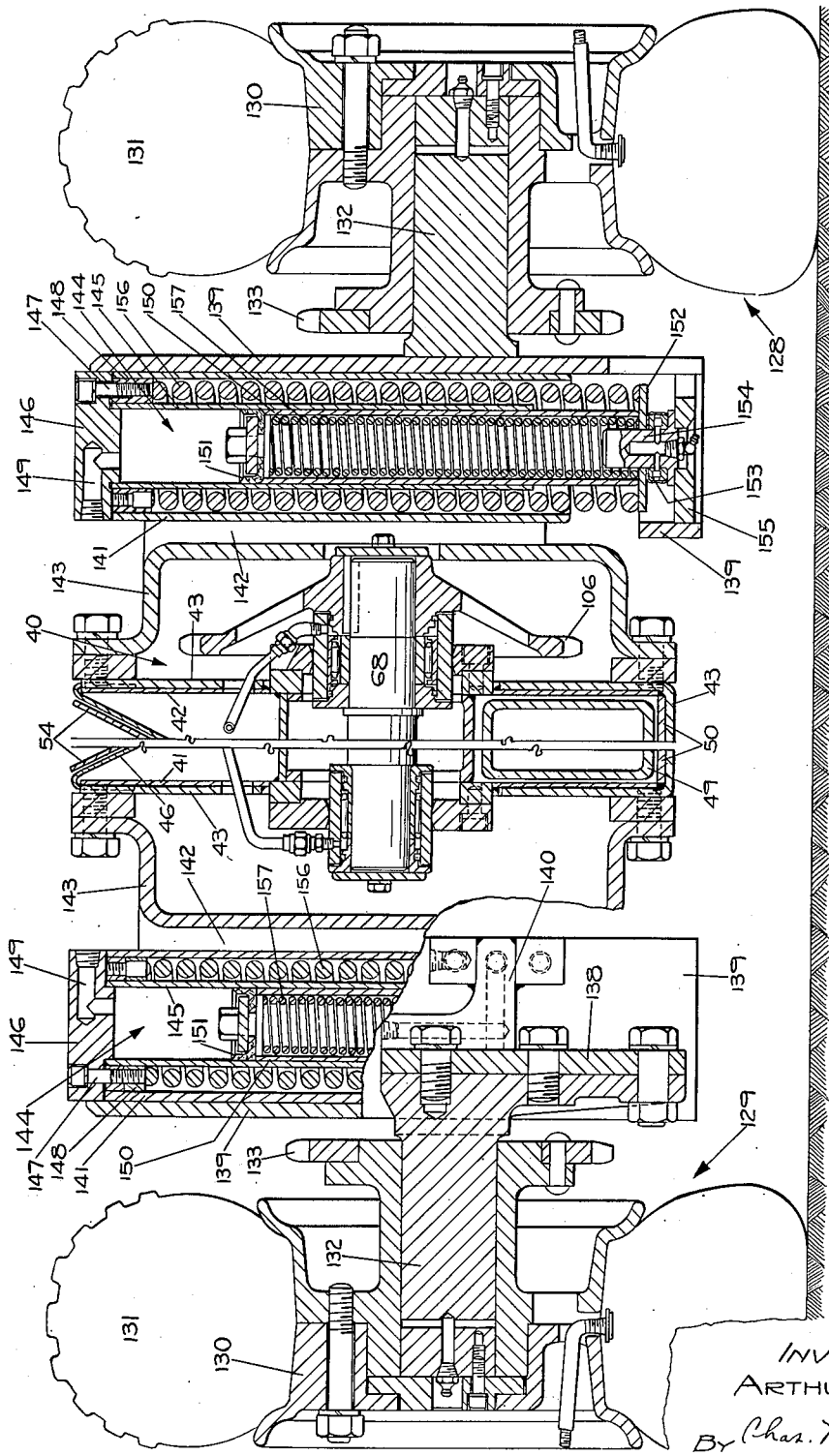
Fig. 3 is a sectional elevational view taken on the line 3—3 of Fig. 1 looking in the direction of the arrows with certain parts broken away in the interest of clarity.
Figure 12:
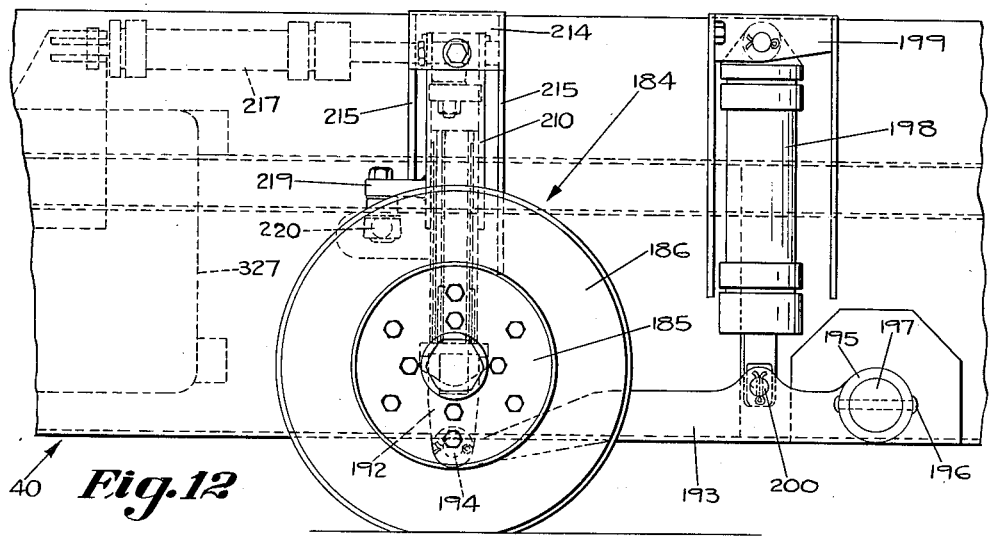
Fig. 12 is an enlarged elevational view showing one of the front wheels and associated mechanism.
Figure 13:
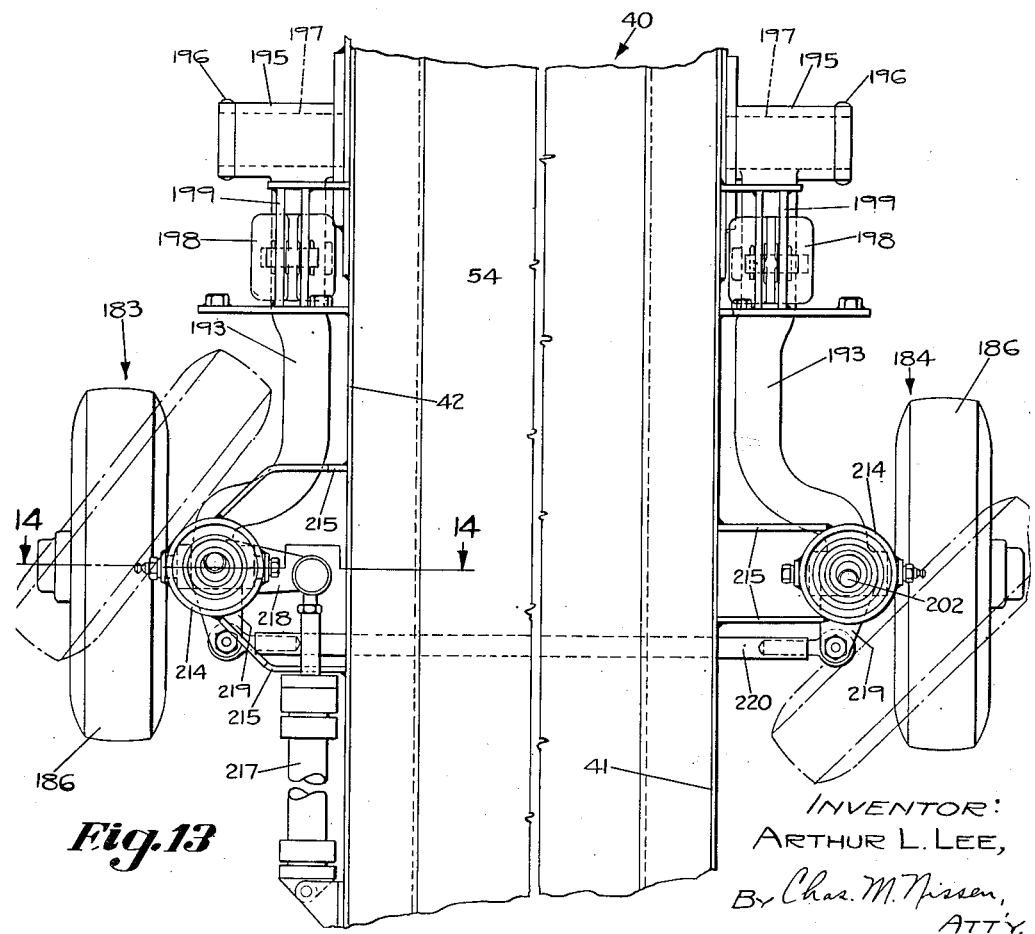
Fig. 13 is a plan view of the mechanism shown in Fig. 12 with the conveyor trough, conveyor mechanism and wheel cover illustrated in Fig. 1 removed.
Figure 24:
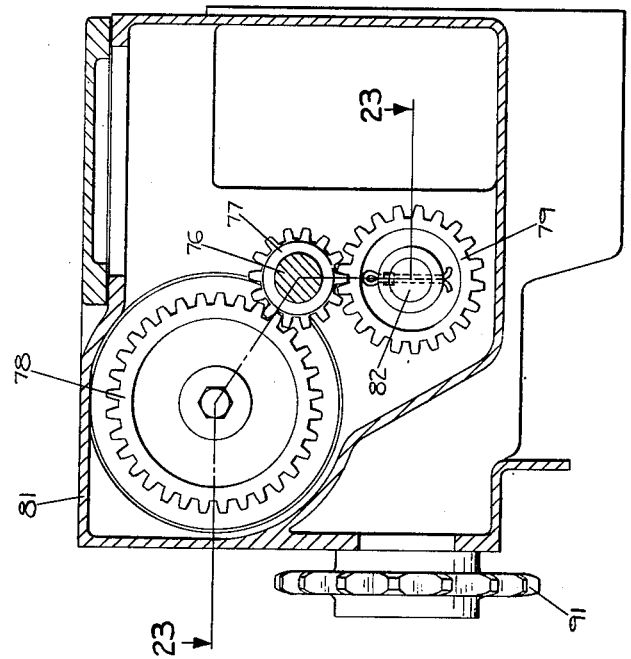
Fig. 24 is a sectional view taken on the line 24—24 of Fig. 3 looking in the direction of the arrows.
Figure 23:
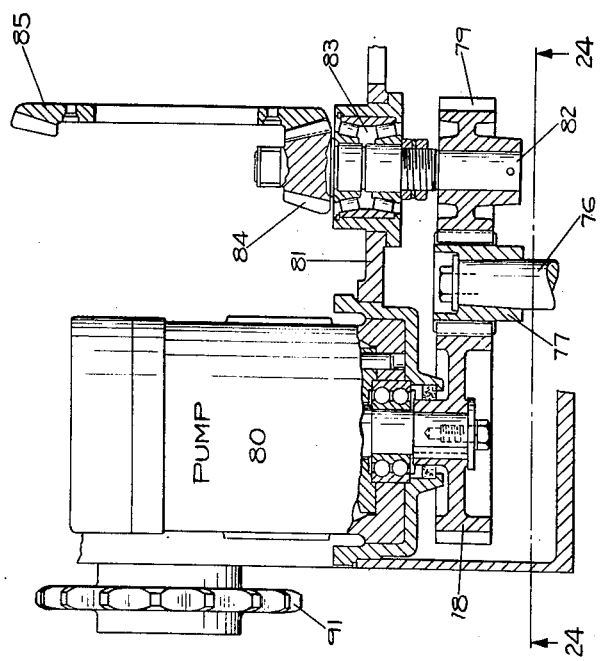
Fig. 23 is a combination plan and sectional view taken on the line 23—23 of Fig. 24, looking in the direction of the arrows.

Referring first to Figs. 1, 2, 3, 4, 5, 18, 19 and 21 of the drawings, it will be seen that the loader or loading type mining machine includes a main frame 40 which is formed by a pair of laterally spaced longitudinally extended spaced apart upright side plates 41 and 42. (See Fig. 18.) Throughout the length of the main frame 40 the side plates 41 and 42 are connected together by transversely extending longitudinally spaced apart members including bottom plates, bars, etc., which are welded or otherwise connected to said side plates 41 and 42. For example, as illustrated in Figs. 3 and 19 of the drawings there is a U-shaped reinforcing trough section or plate 43 which extends between the side plates 41 and 42 the upright sides of which overlap the said side plates 41 and 42 and are welded thereto, thus substantially reinforcing said side plates 41 and 42 and said main frame 40 adjacent this portion thereof.

Also in Figs. 10 and 11 there is illustrated a cross plate 44 which is connected to the bottoms of the side plates 41 and 42 as by welding.

In Fig. 18 there is seen a U-shaped bottom bracket 45 which is welded to the bottom portion of side plates 41 and 42, thus interconnecting them.

Also extending transversely between said side plates 41 and 42 and rigidly attached thereto and forming a part of the main frame 40 is a trough-shaped conveyor pan 46 (see Figs. 4 and 10 for example). The pan 46 has a substantially horizontal bottom and sloping side walls which overlap the side plates 41 and 42 and are rigidly attached thereto, thus also forming a part of the main frame 40. The pan 46 also forms part of the elongated trough of a horizontally extending conveyor 47. It may be stated that to a large extent the main frame of the conveyor 47 and the main frame 40 of the entire loader are one and the same thing.

Telescoping within the main frame 40 and also the frame of the conveyor 47 is a longitudinally extending adjustable frame designated generally by the reference character 48 (see particularly Figs. 10 and 11) which is adapted to be adjusted with respect to the main frame 40 so as to increase appreciably the overall or effective length of the conveyor 47. The frame 48 is formed by a bottom longitudinally extending box work or column 49 (see Figs. 3, 4, 10, 14 and 18) which is slidably contained between the bottom portions of the side plates 41 and 42 of the main frame 40 and is supported upon longitudinally extending main frame plates 50, 50 (see Fig. 4 for example) which are welded to the bottoms of the side plates 41 and 42 and are supported thereby and by the previously mentioned cross plate or bar 43, cross plate 44, bracket 45, etc.

Coöperating with the side plates 41 and 42 to provide guides for the upper portion of the elongated box or column 49 are angle members 51, 51 (see Fig. 4). At its forward end the elongated box or column frame 49 is rigidly attached to a head frame 52 of a gathering head 53, the structure of which will be described more completely hereinafter. The adjustable frame 48 also includes as a rigidly connected part thereof a trough or pan 54 (see Figs. 4 and 10 for example).

Referring particularly to Fig. 10 of the drawings, it will be seen that the forward end of the trough 54 is rigidly attached to the head frame 52 and the connecting bracket 55 (see Fig. 11) aids in effecting this connection, it being rigidly attached to the head frame 52 and pinned to a member forming a part of the trough or pan 54. The trough or pan 54 rests in and is adapted to slide longitudinally and rectilinearly over the conveyor pan 46 of the main frame 40. It is thus obvious that as the gathering head 53 is extended forwardly from the main frame 40, the telescoping sections of the conveyor 47, including the frame members which are integral with the main frame 40 and the longitudinally adjustable frame 48 including the box or column 49, head frame 52 and trough or pan 54, are slidable relative to each other, thus effectively increasing or decreasing the overall length of the telescoping conveyor 47. This provides for maintaining the position of discharge of the conveyor 47 adjacent a fixed point while the gathering head 53 moves rectilinearly inwardly or outwardly to gather coal. Swinging movement of the conveyor in a horizontal plane both while gathering coal and preparatory thereto by frontal attack is also provided, as hereinafter set forth.

In addition to the two telescoping frames 40 and 48 the conveyor 47 includes endless traveling conveyor mechanism 56 which cooperates with the conveyor pans 46 and 54 to provide a scraper type conveyor, said conveyor mechanism 56 including a pair of laterally spaced endless draft chains 57, 57 which are interconnected by a plurality of transversely extending flights 58. The chains 57 are so reeved about the head, foot and intermediate sprockets as to provide for the free extension of the adjustable frame 48 with respect to the main frame 40. To this end said chains 57 extend over laterally spaced sprockets 71 on a head shaft 59 (see Figs. 10 and 20) mounted in spaced journal bearings on the head frame 52. Following the chains 57 in their normal course of travel over said sprockets 71 on shaft 59 they extend rearwardly successively over pans 54 and 46 to spaced sprockets on a discharge or tail shaft 60 journaled in appropriate bearings adjacent the discharge end of the main frame 40 or what is equivalent, the main frame of the conveyor 47. This travel of the endless conveyor mechanism 56 from the shaft 59 to the shaft 60 is the working run or travel thereof and is employed to convey the material delivered to the conveyor 47 rearwardly and discharge it into a receiving conveyor 63 or other receptacle (see Figs. 15, 34 and 36). The subsequent run of the chains 57 extends forwardly from the shaft 60 over a supporting plate 64 (see Fig. 10). Said plate 64 extends between and is welded to longitudinally extending inwardly positioned angle shaped frame members 66, 66 (see Figs. 14, 18 and 21) which members 66 are welded to side plates 41 and 42 and form part of the main frame 40. Transversely extending frame pipes 65 (see Fig. 10) welded to the side plates 41 and 42 help support said plate 64 and are preferably welded to it. This forward run of the chains 57 leads them to spaced sprockets 67, 67 on a drive shaft 68 (see Figs. 10 and 19) which shaft 68 is journaled in spaced anti-friction bearings carried by the side plates 41 and 42 of the main frame 40, as clearly illustrated in detail in Fig. 19 of the drawings.

From the sprockets 67, 67, the run of the chains 57 again extends rearwardly to a pair of spaced sprockets carried by a shaft 62 which is journaled in appropriate bearings carried by longitudinally adjustable tensioning slide blocks one of which is seen at 69 in Fig. 11 of the drawings. This shaft 62 is thus carried by a rearward portion of the box or column 49 forming a part of the longitudinally extensible frame 48.

From the sprockets carried by shaft 62 the chains 57 extend in their lowermost run over the bottom wall of the column or box 49 to the head shaft 59. It is thus to be noted that the head shaft 59 and the shaft 62 are journaled on the extensible frame 48 and consequently move rectilinearly backwardly and forwardly with it. The shafts 60 and 68 are journaled on the main frame 40 and consequently are stationary relative thereto.

In view of the path of travel of the chains 57 and 58 it is obvious that their lengths need not be adjusted while permitting free rectilinear extension of the effective length of the conveyor 47 or, in other words, telescoping movement of the frame 48 with respect to the main frame 40, since the consequent movement of the shaft 62 toward the shaft 68 as the conveyor is extended will compensate for the equal forward movement of the shaft 59 with respect to the shaft 60. As shall be pointed out hereinafter, the conveyor chains 57 not only convey material delivered at the front of the conveyor 47 and discharge it over the tail shaft 60 but they also act to drive a pair of gathering conveyors 70, 70 mounted on the gathering head 53.

The gathering head 53 includes the previously mentioned head frame 52, an integral and important part of which includes a forwardly and downwardly sloping gathering plate 72 (see Figs. 1, 10 and 20) which to an appreciable extent and except for obvious differences, or differences hereinafter mentioned, follows the structure of the gathering head disclosed in the patent to E. P. Corbin, No. 2,341,977, granted February 15, 1944. The Corbin patent also discloses the structure of the two gathering conveyors 70, 70 as well as their relation with the associated gathering plate 72.

Briefly stated it may be pointed out that each gathering conveyor 70 includes an endless conveyor chain 73 which is mounted upon a stationary guide and carries a plurality of flights 74 which in their travel extend forwardly beyond the forward tip of the gathering plate 72 so that they can effectively dig into and tear down coal in a semi-compact mass and can readily gather loose coal, both of which are frequently found in a mine room after the undercut coal has been shot. The two gathering conveyors 70, 70 are, of course, specific illustrations of a preferred form of gathering mechanism, other forms of which may be employed within the scope of my invention in some of its broader aspects. It is obvious that the gathering conveyor 70 will operate to gather coal either while the gathering head 72 is fed rectilinearly or laterally by a swinging movement. Furthermore, the gathered material is obviously carried by the flights 74 up the incline of the plate 72 and discharged into the path of the endless conveyor mechanism 56 by being discharged onto the forward and downwardly curved portion of the trough or pan 54, which curved portion is clearly illustrated in Fig. 10 of the drawings. The material is then carried rearwardly by the chain and flight conveyor mechanism 56 and discharged over the tail shaft 60 into the receiving conveyor 63.

Attention is now directed particularly to Figs. 1, 2, 19 and 21 to 24, inclusive, and to the drive mechanism by which the endless chains 57 and the two gathering conveyors 70 are driven. As best seen in Fig. 1 of the drawings there is an electric motor 75 which is the only electric motor on the loader and which is the primary source of power for operating all of the power operated devices thereon. Said motor 75 is carried on an appropriate support provided at one side of the main frame 40 and is rigidly attached to said main frame. Extending forwardly from the motor 75 is its rotor or armature shaft 76 (see Fig. 23) provided with a spur gear 77 which is in continuous mesh with a pair of spur gears 78 and 79, the former of which is keyed to and continuously drives a hydraulic pump 80, said pump 80 being supported in an enclosing housing 81 which also encloses the gears 77—79.

The hydraulic pump 80 supplies hydraulic fluid under pressure for the hydraulic system which is described in detail hereinafter. The gear 79 drives a shaft 82 which is supported in appropriate bearing means 83 carried by a wall of the housing 81. Said shaft 82 is also provided with a beveled pinion 84 which meshes with and drives a bevel ring gear 85 which is riveted or otherwise firmly attached to the housing 86 of a disc type friction clutch 87 (see Fig. 21). The clutch 87 is per se of standard design though the operating mechanism therefor has been designed particularly for the loader of my invention and it shall be described in some detail. The clutch housing 86 is, of course, continuously rotating with the electric motor 75 by virtue of the gear train above described and the clutch is engaged or disengaged so as to drive a rotor 88 by virtue of a disengaging ring 89 which is subject to manual control. Rotor 88 is keyed to a hollow drive shaft 90 which extends toward the main frame 40 and at the end carries a drive sprocket 91. To control the engagement and disengagement of the clutch 87 by controlling the ring 89, there is a slidable cylindrical head 92 in the hollow shaft 90 provided with a transverse slot through which an operating pin 93 extends, said pin 93 also extending through elongated slots in the shaft 90 and the sleeve of the rotor 88 and abutting the ring 89 so as to push it to the left, as viewed in Fig. 21, as the head 92 is urged to the left under the action of compression coil spring 94. Coil spring 94 is contained within the hollow shaft 90 and at the left hand end abuts a washer which in turn abuts the head 92 and at the right hand end abuts an abutment member 95 which is welded or otherwise attached to the right hand end of shaft 90. Thus the spring 94 normally urges the clutch 87 into engaging position.

Extending into the hollow shaft 90 and through the coil spring 94 is an operating rod 96 which is longitudinally shiftable but non-rotary and since the head 92 rotates with the shaft 90 and clutch rotor 88 an anti-friction ball bearing connection 97 is provided between the left hand end of the rod 96 and said head 92. To increase its flexibility the rod 96 is broken in two and pivotally connected at 98 which also provides for the assembly and disassembly of the parts.

At its right hand end, as viewed in Figs. 21 and 22 of the drawings, the rod 96 is pivotally connected by a pin 99 to a pair of parallel rods 100 which extend through and are connected to a pin 101 mounted in an operating handle 102 which is pivoted by pin 103 between the spaced operating arms of a bracket 104 mounted on the side plate 41. The operating mechanism just described is of the self-locking, over center type and as illustrated the handle 102 is in the clutch disengaging position with the spring 94 under compression. By moving the handle 102 downwardly it is obvious that the rod 96 will be released and the spring 94 will operate to engage the clutch 87. Adjustment of the operating mechanism is provided by adjustable nuts 105 provided on the rods 100. When the shaft 90 is driven upon the engagement of the clutch 87 it drives the drive sprocket 91 which in turn drives a sprocket 106 (see Figs. 1 and 19) by means of a chain 107 which meshes with the two sprockets 91 and 106.

As illustrated best in Fig. 2 of the drawings, an idler sprocket 108 is provided to ride on the upper run of chain 107 and to take up the slack as well as maintain it in mesh with a large number of teeth on both of the above mentioned sprockets.

Referring particularly to Figs. 10 and 19 of the drawings, it will be seen that by driving the shaft 68 from the sprocket 106 to which it is keyed the endless chains 57 of the conveyor mechanism 56 are driven through the spaced sprockets 67. Thus power from the electric motor 75 is extended to drive the endless conveyor mechanism 56 under the control of the clutch 87. Furthermore, since the chains 57 also drive the shaft 59 (see Figs. 10 and 20) by way of sprockets 71, a drive is also provided from the motor 75 to the two gathering conveyors 70. This drive is completed from the shaft 59 by similar drive mechanism at opposite ends thereof, one of which drive mechanisms is shown in Fig. 20 of the drawings. This drive mechanism comprises a bevel gear 109 keyed to the end of shaft 59 which meshes with another bevel gear 110 keyed to an upright shaft 111. The shaft 111 has at its top an integrally formed drive sprocket 112 which drives the endless chain 73 of the associated gathering conveyor 70. The shaft 111 is mounted in top and bottom anti-friction bearings 113 and 114 received respectively in top and bottom cups formed in a casting 115, which casting also is provided with an anti-friction bearing 116 which receives and supports the shaft 59. Individual grease passageways and associated grease fittings 117 are provided for the bearings 113 and 114. It is to be noted that by virtue of the single casting 115 absolute alignment between the bevel gears 109 and 110 is assured.

The casting 115 is welded in place to the top plate 72 and another plate forming a part of the head frame 52. A removable access door 118 is provided giving access to the housing for casting 115 and gears 109 and 110 which is formed as an integral part of the head frame 52. It is, of course, obvious that a similar structure is provided on each side of the head frame 52 for operating both of the gathering conveyors 70. It is thus to be noted that the conveyor chains 57 not only operate to convey material but they are also an element in the gear train for driving the two gathering conveyors 70 from the electric motor 75. In addition to conserving parts and material and employing the chains 57 for a double function, this insures that the gathering conveyors 70 will always operate with the conveyor mechanism 56.

As was previously mentioned, the longitudinally adjustable frame 48 which includes the head frame 52 as an integral part thereof, is shiftable longitudinally and rectilinearly with respect to the main frame 40 of the loader and the conveyor 47. This shifting movement is effected in reverse directions by power operated mechanism so that the operator may readily adjust the gathering head 53 either forwardly or rearwardly during operation of the machine. The mechanism which provides for this rectilinear movement is seen best by reference to Figs. 1, 2, 11 and 18 of the drawings.

As best seen in Fig. 1 of the drawings, there is a rotary hydraulic motor 119 provided with an integrally formed speed reducing mechanism which may for practical purposes be considered as part of the motor. The output shaft of the motor 119 is provided with a sprocket 120 (Fig. 1) which drives a larger sprocket 121 by means of a chain 122. The sprocket 121 (see Fig. 18) is keyed to a shaft 123 mounted in appropriate spaced anti-friction bearings on the side plates 41 and 42 of the main frame 40. Adjacent each end, the shaft 123 is provided with a sprocket 124 rigidly attached thereto as by welding.

As best seen in Fig. 11 of the drawings, each sprocket 124 meshes with a strand of chain 125 which is guided over the sprocket 124 to have mesh over a large portion of the circumference thereof by forwardly and rearwardly spaced rollers 126. One end of the chain 125 is anchored adjacent the rear end of the column or box 49 and the other end is anchored by adjustable anchorage mechanism 127 adjacent the forward end of said column or box 49 which is adjacent the head frame 52.

It is, of course, obvious that the shaft 123, the sprockets 124 and the rollers 126 are mounted on the main frame 40 while the two chains 125 are mounted on the longitudinally adjustable frame 48. Consequently as shaft 123 and sprockets 124 rotate they produce relative rectilinear or sliding movement between the main frame 40 and the adjustable frame 48, thus producing the aforedescribed rectilinear extension or retraction of the adjustable frame 48 with respect to the main frame 40. It is obvious that by reversing the direction of the shaft 123 under the action of the hydraulic motor 119 which is reversible, the overall length of the conveyor 47 may be readily increased or decreased between the maximum and minimum limits. The hydraulic system which provides the control of the hydraulic motor 119 will be described hereinafter.

Adjacent its front end, the vehicle or loader is provided with a pair of power operated or traction wheel assemblies 128 and 129. The two wheel assemblies 128 and 129 are generally of similar structure and thus unless a contrary fact is indicated such a condition is understood to prevail.

The wheel assembly 128 is on the right hand side as viewed by an operator looking toward the front of the machine and the wheel assembly 129 is on the left hand side. These two wheel assemblies are thus on opposite sides of the main frame 40 and the conveyor 47, and during transportation or rectilinear travel of the vehicle they act to drive it generally in the manner of an ordinary automobile or other power driven steerable vehicle. In other words, the wheels of these two assemblies travel parallel paths and have a common horizontal axis of rotation normally transverse to the longitudinal axis of the main frame 40 and conveyor 47. However, these wheel assemblies 128 and 129 are provided with means whereby their wheels may be swung on vertical axes and also each wheel may be vertically adjusted with respect to the main frame 40.

Referring particularly to Figs. 3, 4, 5, 6, 7 and 8 of the drawings, it will be noted that except for certain differences specifically mentioned, the two wheel assemblies 128 and 129 are similar and consequently similar reference characters will be employed to indicate the individual parts thereof.

Each of said wheel assemblies includes a wheel 130 provided with a pneumatic tire 131 and for practical purposes the tire and wheel may be considered within the generic expression "wheel," particularly as employed in the claims. Each wheel 130 is mounted on a stub shaft 132 and as previously mentioned the two stub shafts 132 have a common horizontal axis extending transversely of the main frame 40. The hub of each wheel 130 is provided with a sprocket 133 which is driven by an individually reversible hydraulic motor 134 (see Figs. 7, 8 and 9), operating through a speed reducer 135 the power shaft of which carries a sprocket 136 (see Fig. 7) which is geared to the sprocket 133 by a chain 137. In other words, there is a separate reversible hydraulic motor 134 for each of the wheel assemblies 128 and 129.

As best seen by reference to Figs. 3, 7 and 8 of the drawings, each stub shaft 132 is rigidly attached to an upstanding plate 138 which in turn is rigidly attached as by welding to a generally cylindrical housing 139.

As clearly illustrated in Figs. 7 and 8 of the drawings, the motor 134 and the speed reducer 135 are removably bolted and thus rigidly but removably attached to the plate 138, cylindrical housing 139 and stub shaft 132. It is thus evident that the motor 134 and speed reducer 135 partake of all the movement of the axle 132 and as hereinafter described each of the wheel units 128 and 129 is both vertically adjustable and swingable about a vertical axis, the vertical adjustment providing for adjusting the elevation of the forward end of the gathering head 53 as well as the pressure thereof on the mine floor when it is resting thereon. In addition there is a spring connection which allows either wheel to accommodate itself to an irregular surface such as a hole or bump on the mine floor as the device travels thereover.

It may also be mentioned that mounted on the plate 138 (see Fig. 3) is a bracket 140 provided with hydraulic hose connections and passageways (which receive the hoses not shown in detail) leading to the motors 134. Each of the cylindrical housings 139 has a close but sliding or telescoping fit with a cylinder 141 which on its inner edge is welded or otherwise rigidly attached to an upright plate 142 welded to a side bracket 143 which is bolted at its top and bottom to the side plates 41 and 42 and the upstanding plates of the reinforcing member 43 as clearly illustrated in Fig. 3 of the drawings.

It is obvious that the sliding relation between the close fitting cylindrical members 139 and 141 provide for vertical adjustment of the wheel assemblies 128 and 129 with respect to the main frame 40 and also provide for their swinging movement about the spaced vertical axes of the two cylinders 141. That is, each wheel assembly 128 and 129 is swingable and vertically adjustable about and along a distinct upright axis. To adjust each wheel 130, 131 vertically each of the wheel assemblies 128 and 129 includes a single acting hydraulic piston motor 144 (see Fig. 3). Each of said motors 144 includes a cylinder 145 which is within and concentric with the cylinders 139 and 141 and at its upper end is closed by a head 146 which in turn is removably but rigidly attached to the upper ends of cylinders 141 and 145 by means of machine screws 147 which thread into a ring 148 welded to both said cylinders 141 and 145. Each head 146 is provided with a hydraulic fitting receiving passageway 149 leading to the interior of the cylinder 145 and thus providing for the feeding of hydraulic fluid thereto. Working within each cylinder 145 is a cylindrical piston 150 which has a close but sliding fit with each cylinder 145. The upper end of the piston 150 carries a leak proof packing ring 151 which is removably connected to said cylindrical piston 150. The lower end of the cylindrical piston 150 has a loose but abutting connection with a disc 152 which rests on the upper race of an antifriction thrust bearing 153 carried on an upwardly extending post 154 which is rigidly attached to and mounted on a bottom plate 155 rigidly attached to and forming the bottom of the cylinder 139. Between the two cylinders 141 and 145 is a heavy coil spring 156, the top of which abuts the ring 148 and the bottom of which abuts the disc 152. The two coil springs 156 thus carry a portion of the load which is transferred from the main frame 40 to each wheel 130, 131, and also act as lateral stabilizing springs, since the rear wheels are independently vertically adjustable.

There is a further and much weaker coil spring 157 within the cylindrical piston 150 the top of which abuts the top of said piston 150 and the bottom of which abuts the disc 152 and at its bottom surrounds the post 154.

Under normal conditions with the wheel assemblies 128 and 129 supporting the front end or gathering head 53 of the loader off the ground the parts will be in the position illustrated in Fig. 3 of the drawings in which the hydraulic motor or jack 144 is partially expanded and the spring 157 is compressed the maximum amount permitted by the cylindrical piston 150. If the hydraulic jack or motor 144 is contracted under these conditions the wheels 130, 131, together with the cylinder 139, will slide upwardly with the cylindrical piston 150 further compressing the heavy spring 156 and lowering the gathering head 53 until it reaches the mine floor. This is a normal working condition while the previous condition is a transporting condition.

Under the working condition it is, of course, obvious that an appreciable amount of the weight of the loader may be transferred from the wheels 130, 131 to the head 53. It is desirable, however, to insure adequate traction on the wheels 130, 131 when the head 53 is resting on the mine floor and the loader is gathering coal. This is an additional function of the spring 156 and a function of the spring 157, that is, these two springs insure that there is appreciable downward force on the associated wheels 130, 131 and should a hole or depression appear in the floor into which a wheel 130, 131 travels it is evident that the springs 156 and 157 will expand to keep some of the load on said wheel. Under such conditions the disc 152 will move downwardly and separate from its normal contact with the bottom of the cylindrical piston 150, the wheels 130, 131 and axle 132 together with the cylinder 139 also, of course, moving downwardly with it relative to the cylinders 141 and 145.

It is, of course, obvious that by forcing hydraulic fluid into the cylinders 145 by way of passageways 149 the hydraulic motor or jack 144 may be expanded and by draining hydraulic fluid from them they may be contracted. Thus the elevation of the front end of the loader may be adjusted so that it is either in contact with the mine floor for loading purposes or is above said mine floor for transportation purposes.

In Fig. 2 of the drawings the loader is illustrated with the front end or gathering head just barely touching the mine floor and for transportation purposes it will be slightly elevated so as to clear the mine floor.

In addition to providing for vertical adjustment of the wheels 130, 131 relative to the main frame 40 provision is also made to swing them about laterally spaced vertical or upright axes so that they may swing from the full line position illustrated in Fig. 1 of the drawings to the dotted line position indicated therein. In other words, so that they may swing inwardly adjacent their front ends toward the main frame 40 or from a position in which they travel parallel paths and thus when rotated move the machine in a generally longitudinal or rectilinear direction, to a position in which they travel substantially in tandem, though not exactly so since their axes of rotation intersect substantially along a vertical pivotal axis adjacent the discharge end of the loader. This is provided so that the unit may be swung under power about a vertical axis adjacent its discharge end, thus maintaining the position of discharge of the loader at a substantially fixed place while the gathering head 53 is swung over a wide arc which may be through an arc of almost 360 degrees and with the rectilinear adjustment of the head 53 will provide for the gathering of coal at substantially any position in a mine room having a width not greater than twice the maximum extensible length of the loader.

The relation between each of the cylinders 139 and 141 is also such as to provide for swinging movement of said cylinder 139 about their upright axes, thus providing for swinging of the wheel assemblies 128 and 129 so that the wheels 130, 131 assume the dotted line positions as above described. To this end a portion of the wall of each cylinder 139 is cut away from the top down to a position terminating just above the bottom thereof and through an arc in excess of 115 degrees. This is best illustrated in Fig. 5 of the drawings where the cut-out portion of each cylinder 139 is seen at 158. These cut-out portions 158 are necessary to permit turning of the cylinder 139 on the cylinder 141 because of the presence of the vertical attaching plate 142 which traverse this cut-out area whenever the wheels swing inwardly on said upright axes.

In Figs. 4 and 5 of the drawings mechanism is illustrated which provides for locking the two wheel assemblies 128 and 129 in parallel and tandem positions which terms shall be employed to indicate the two conditions previously described. As illustrated in Figs. 4 and 5 the wheel assemblies 128 and 129 are in the parallel position.

Each of the cylinders 139 is provided with a pair of vertical integral arms, those associated with cylinder 139 of the wheel assembly 128 being designated 159 and those associated with cylinder 139 of the wheel assembly 129 being designated 160. Extending between the arms 159 is a pivot pin 161, a similar pivot pin 162 extending between the arms 160. Mounted upon the pin 161 for relative sliding movement therealong is an operating lever 163, a similar lever 164 being pivoted to and slidable along pin 162. It is, of course, obvious that this sliding relation is necessary between the pins 161 and 162 and their associated levers 163 and 164 since the cylinder 139 and consequently arms 161 and 162 are vertically movable relative to the main frame 40 while the levers 163 and 164 are not so readily movable vertically but on the other hand are held against vertical movement relative to the main frame 40. The levers 163 and 164 extend through appropriate openings in the side plates 42 and 41 and while being free to move inwardly and outwardly are held against vertical movement by top and bottom guides formed by U-shaped top and bottom plates 165 and 166, respectively, best seen in Fig. 4 of the drawings. The opposite ends of these plates 165 and 166 are welded to the side plates 41 and 42 as well as to angle members 51 and frame members 66. The inner ends of the levers 163 and 164 are pivotally connected to pins 167 and 168, respectively, which extend between linkage mechanism in the form of a pair of discs 169 which are welded at their centers to a hub 170 (Fig. 6) which hub is connected by a pin 171 between the top and bottom plates 165 and 166.

It is obvious that the two discs 169 and associated apparatus cooperate with the levers or arms 163 and 164 to provide a crank mechanism so that if the discs 169 are rotated counter-clockwise, as viewed in Fig. 5 of the drawings, the forward ends of the wheels 130, 131 will swing inwardly toward the main frame 40. Likewise the linkage above described which interconnects the wheel assemblies 128 and 129 is such as to require the two wheels 130, 131 to swing inwardly similar amounts when either of them so swings. Locking mechanism is provided in association with the top one of the discs 169 so that the wheel assemblies 128 and 129 may be locked in both the parallel and the tandem positions. This locking mechanism includes a lug 172 (see Fig. 6) which is firmly attached to a longitudinally extending rod 173 which rod is pivotally mounted in spaced supporting blocks 174. At its forward end the rod 173 carries an axial projection 175 to which a coil spring 176 is attached, the other end of the spring 176 being attached to a fixed plate on the upright side plate 41, as clearly illustrated in Fig. 6 of the drawings. The coil spring 176 will normally bias the rod 173 and lug 172 to the position illustrated in Figs. 4, 5 and 6 of the drawings.

The rear end of the rod 173 is provided with an operating handle 177 which extends through a slot in the side plate 41 and, as illustrated in Figs. 1 and 2 of the drawings, is located adjacent the clutch operating handle 102, both of which are located adjacent an operator's platform 178. As illustrated in Fig. 1 of the drawings the operator's platform 178 is to one side of the main frame 40 and substantially opposite the electric motor 75. The platform 178 is so constructed that an operator may sit on it with his feet on the ground or may be supported entirely by it in a semi-reclined position and face either forwardly or rearwardly.

With the parts in the position illustrated in Figs. 4, 5 and 6 of the drawings the wheel assemblies 128 and 129 are locked with the wheels in parallel positions by virtue of cooperation between lug 172 and an upwardly extending projection 179 carried by the top disc 169 adjacent a notch 180 formed therein. The notch 180 permits the operating handle 177 to be lifted and through the action of the rod 173 swing the lug 172 with the right hand portion moving downwardly through the notch 180, thus releasing the discs 169 and consequently releasing the wheel assemblies 128 and 129 for swinging movement. The rear end of the lug 172 provides a stop with a similar plate connected to the main frame 40.

Assuming that the lug 172 has been released from the projection 179, as above described, and power is applied to the two wheels 130, 131 so as to tend to move them in a direction to drive the loader forwardly, it is obvious that a torque will be produced by each of said wheels about the upright axes of the two cylinders 139. Since the wheel assemblies 128 and 129 are not locked under the assumption, each of these wheels will automatically swing inwardly and the discs 169 will rotate on the pin 171. If the handle 177 is released as soon as this inward swinging movement starts, lug 172 will ride on the sloping periphery of the top disc 169 and under the influence of spring 176 will drop into a second notch 181 on the top disc 169 when the two wheels 130, 131 have reached the desired maximum position of inward swing or, in other words, when they are in the desired tandem position for swinging the loader about its rear pivot point. A projection 182 is also provided adjacent notch 181 to increase the bearing contact with the lug 172 when it is in said notch 181. In other words, the locking mechanism above described may releasably operate to lock the wheel assemblies 128 and 129 in either the parallel or tandem positions. If the wheels are in the tandem position and it is desired to adjust them to the parallel position, the latch mechanism is released and power is applied to each of the wheels 130, 131 tending to rotate them in opposite directions outwardly from the main frame 40. Since they are free to pivot with the latch mechanism unlatched they will swing about their upright pivotal axes and when the discs 169 are rotated a sufficient amount, the lug 172 will, if the handle 177 is released, drop into the notch 180 and again lock them in either parallel position. It is thus obvious that the wheel assemblies 128 and 129 may be operated under their own power to adjust them either from the parallel position to the tandem position or vice versa.

Adjacent the rear end of the loader is a pair of steering and supporting wheel assemblies 183 and 184, best seen in Figs. 1, 2, 12 and 13 of the drawings. These wheel assemblies 183 and 184 are of similar design except for certain obvious differences or differences which will be hereinafter pointed out. Wheel assembly 183 is on the right hand side of the vehicle, as viewed from the rear end thereof looking forward, and wheel assembly 184 is on the left hand side. The two assemblies are thus laterally spaced on opposite sides of the main frame 40 or, in other words, the main frame 40 and conveyor 47 extend between them, as in the case of wheel assemblies 128 and 129.

In the operation of the loader once it has reached its position and is pivotally connected to the receiving conveyor 63, it is necessary to lift the wheel assemblies 183 and 184 to permit the afore-described swinging movement of the loader under the influence of the traction wheel assemblies 128 and 129. Furthermore, the wheel assemblies 183 and 184 provide for steering of the loader as it is transported as a self-contained vehicle or unit by being driven from one place to another. These two characteristics require certain special design which is, of course, complicated by the presence of the conveyor 47 between them.

Each of the steering wheel assembles 183 and 184 includes a wheel 185 provided with a pneumatic tire 186 which together may be referred to as the wheel, particularly in connection with the claims. Each wheel 185 is mounted for rotation on a stub shaft 187 (see Fig. 14) by anti-friction bearings. The inner end of the stub shaft 187 has a downwardly extending stub shaft portion 188 and an upwardly extending shaft portion 189. On the bottom of the stub shaft 188 is an anti-friction thrust bearing 190 which is held thereto by a nut and washer 191 and which transmits the load through mechanism, hereinafter described more completely, from the main frame to the wheel 185, 186 through a bracket 192 which at its upper end is journalled about the stub shaft 188 for free rotation on the upright axis thereof.

A longitudinally extending supporting arm 193 is pivotally connected by a pin 194 to each bracket 192 of the two wheel assemblies 183 and 184. Each arm 193 extends rearwardly to an integrally formed bearing box 195 and is pivotally connected as by a ring and pin 196 (see Fig. 12) to a transversely extending horizontal stub shaft 197 which is rigidly attached to the main frame 40. It is thus obvious that the two wheel assemblies 183 and 184 are mounted for independent swinging movement about the horizontal axis of the stub shafts 197. To adjust the arms 193 about the axis of shaft 197 and thus to adjust the wheel assemblies 183 and 184 upwardly and downwardly each of said arms 193 has associated therewith a hydraulic piston motor or jack 198. The two motors or jacks 198 are of the double acting type so that they can be contracted or expanded under power, and locked in any position. The cylinder of each of the jacks 198 is pivotally connected to a bracket attached to each side plate 41 and 42 of the main frame 40, as clearly illustrated in Figs. 12 and 13 of the drawings. The piston rod of each hydraulic motor 198 is pivotally connected by a pin 200 to an arm 193. Since the wheel assemblies 183 and 184 must be steered together as well as be vertically adjusted special mechanism is provided to effect this result. The wheel assemblies 183 and 184 are of the dirigible type and always move together about their laterally spaced upright axes which are the axes of the two shafts 189.

As best seen in Fig. 14 of the drawings the shaft 189 is provided with an elongated keyway 201 which is closed at its top by a screw 202, the head of which overlaps said keyway 201. Slidably mounted on the outside of shaft 189 is a cylinder or tube 203 which has a key 204 welded to the bottom thereof adapted to slide in the keyway 201. The exterior surface of the tube 203 is provided with a keyway 205 which extends from the bottom and terminates before reaching the top thereof. Outside the cylinder 203 is another cylinder or tube 206 which at its bottom is provided with a welded key 207 adapted to slide in keyway 205. The external surface of cylinder 206 is provided with a keyway 208 extending from the bottom and terminating before reaching the top and a key 209 welded to the bottom of another cylinder or tube 210 is adapted to move in said keyway 208.

The cylinder 210 is provided at its top with upper and lower rings 211 which are welded thereto and which receive a two piece bolted together or split collar 212 which is received in adjustably spaced trunnions 213 carried by a ring 214 which is supported one from the side plate 41 of the main frame 40 and the other (illustrated in Fig. 14) from the side plate 42 thereof by means of a pair of upwardly extending plates or arms 215. Removably supported on each ring 214 and also attached to other portion of the main frame 40 is a removable cover plate 216 which is illustrated particularly in Figs. 1 and 14 of the drawings but which has been omitted in the interest of clearness from Figs. 12 and 13 of the drawings.

It is obvious from the above description that the shaft 189, the cylinder 203, the cylinder 206 and the cylinder 210 are in telescoping relation and permit considerable vertical or up and down adjustment of the two wheels 185, 186 without disengaging these telescoping members. Disengagement of said members is, of course, prevented by the cooperation between the welded keys and the keyways. It is obvious that as the arms 193 are swung about the axis of shaft 197 not only are the wheels 185 and 186 going to be raised and lowered but a certain amount of swinging movement will take place in the extensible arm or member provided by the above described telescoping parts. This is made possible by the pivotal connections at pin 194 and at the trunnions 213.

The cooperating keys and keyways provide for the steering or dirigible action of the wheel assemblies 183 and 184 and to provide for this there is a double acting hydraulic piston motor or jack 217 (see Fig. 13) the cylinder of which is pivotally connected to a bracket on the side plate 42 of the main frame 40 and the piston rod of which is pivotally connected to an arm 218 which is welded to the cylinder or tube 210. There is only one motor 217 and arm 218 and that is the one associated with the wheel assembly 183. Each of the cylinders 210 also has a forwardly extending arm 219 welded thereto and the two arms 219 are connected by a cross rod or link 220 pivotally attached at each end to an arm 219, thus to insure dirigible or swinging movement of the two wheels 185, 186 together in response to actuation of the double acting hydraulic piston motor 217. It is, of course, obvious that there is no relative up and down movement of the rod 220 with respect to the main frame 40 and consequently it extends through openings in the side plates 41 and 42 of said main frame 40 and between working and lower runs of the conveyor mechanism 56. It is, of course, obvious that the cylinders 210 do not move upwardly and downwardly with respect to the main frame 40, though they do have a limited swinging movement with respect thereto on horizontal axes, and the openings in the side plates 41 and 42 which accommodate the cross rod 220 are adequate to accommodate such limited movement. Extensive up and down movement of the wheels 185, 186 together is, however, possible while maintaining the steerable connection between the two wheels by virtue of the aforedescribed telescoping connection.

As previously mentioned, during swinging movement of the loader it is desirable to lift the wheels 185, 186 off the mine floor and during this condition of the loader the rear end is supported by a pivotal connection, described hereinafter. The range of adjustment of the wheel assemblies 185, 186 is such that by contracting the hydraulic motors or pistons 198 it is possible to elevate the two wheels 185, 186 so that they will not touch the ground under the mentioned conditions. Furthermore, in some cases the receiving conveyor 63 may have an appreciable height and the method by which the rear end of the loader is elevated so as to provide the pivotal connection hereinafter described is to expand the motors 198 and the above mentioned telescoping connection of the wheel assemblies 183 and 184 provides for elevating the discharge end of the loader a very large amount.

Attention is now directed particularly to Figs. 2, 10, 15, 16 and 17 and to the structure which provides the pivotal connection between the discharge end of the loader and the receiving conveyor 63. As best seen in Figs. 10 and 17 of the drawings, extending transversely between the bottom portions of the side plates 41 and 42 and rigidly attached thereto, as by welding, is a composite plate structure 221 which is also rigidly attached, as by welding, to the plate 64. Substantially midway between the side plates 41 and 42 of the main frame 40 and also substantially directly below the tail shaft 60 and rigidly attached to the composite plate structure 221 by welding is a downwardly extending ball 222. The ball 222 is adapted to be received in a socket 223 which is provided with a tapering guide or throat 224 which will assist in guiding the ball 222 into the receiving socket 223. A locking pin 225 is provided to hold or lock the ball 222 removably in the socket 223. The socket 223 is carried in the top of a relatively high chute 226, as illustrated in Figs. 15, 16 and 17 of the drawings and, as illustrated in Fig. 2 of the drawings, it is carried directly in the rear portion of the receiving conveyor 63. The chute 226 is rigidly attached to the rear end of the receiving conveyor 63 as by removable bolts 227.

Figure 33:
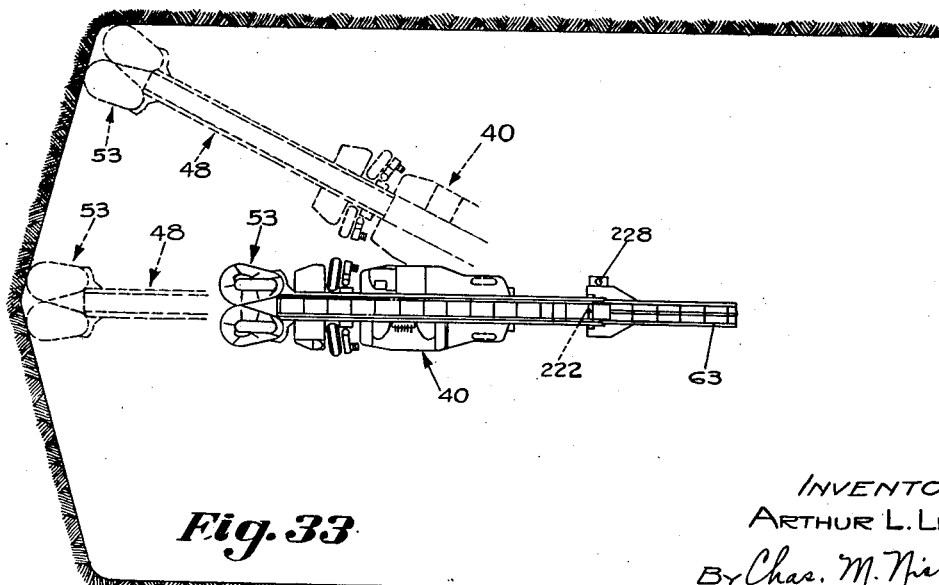
Fig. 33 is a diagrammatic plan view showing a mine room and the loader of my invention therein in various positions.

As best illustrated in Figs. 33 and 34 of the drawings, there is a roof jack or other firm anchorage mechanism 228 which firmly anchors the rear end of the receiving conveyor 63 against movement in any direction. This anchorage is, of course, removable but when once set will hold the receiving conveyor 63 in place.

With the ball and socket assembly as seen in Figs. 15, 16 and 17 of the drawings it is obvious that the loader is free to swing in a substantially universal manner but of particular importance is the fact that it can swing about an upright or vertical axis through approximately 360 degrees or, in other words, if the mine room is wide enough, until it strikes the receiving conveyor 63 from the reverse sides. In normal conditions, however, the loader will not swing through an arc in excess of 180 degrees.

The ball and socket connection 222, 223 also provides an anchorage or abutment which takes a considerable portion of the thrust of the gathering head 53 as it is forced into the semi-compact or loose coal during the loading operation. This is a matter of considerable and practical importance over those machines which must rely solely on their weight and traction with the ground or mine rails to provide thrusting force during loading. To provide for removal of the ball 222 from the socket 223 the locking pin 225 is mounted for shifting movement along its axis to a ball removing position and this shifting of movement may be effected by an operating handle 229 which is pivotally connected to the pin 225 and is mounted for limited movement adequately to provide for such removal.

As illustrated in Figs. 35 and 36 of the drawings, there is a slightly different mechanism provided to afford the anchorage for the ball 222 which has all of the functions previously described in connection with the socket 223 and chute 226 except that it is designed particularly for a situation in which the loader discharges over the side of the receiving conveyor 63 rather than over the end thereof. The apparatus disclosed in said Figs. 35 and 36 comprises a pair of spaced roof jacks 230 which may be anchored in position and which carry between them a transversely extending bar 231 which at its center is provided with a socket 232 which receives the ball 222. The socket 232 has substantially the same structure as the socket 223 except that it is mounted on bar 231 instead of chute 226. To prevent coal discharged from the loader spilling over the side of the receiving conveyor 63 there is an upwardly extending spill plate and chute 233 attached to one of the side walls of the receiving conveyor 63 and positioned in front of the discharge end of said loader. Thus coal discharged by the loader will strike against the spill plate 233 and be guided onto the receiving conveyor 63.

Attention is now directed to Figs. 1 and 9 of the drawings which illustrate diagrammatically the hydraulic system of the loader.

As best seen in Fig. 1, there is a platform 234 adjacent the front end of the main frame and rigidly attached thereto which extends laterally to both sides thereof. On one side this platform supports the previously described hydraulic motor 119. It also supports a headlight 235 which may be readily detached to reduce the effective overall height of the machine operating in very low coal. On the other side of the platform 234 is a tank 236 for the hydraulic fluid which is preferably oil. Leading from the tank 236 is a feed pipe conduit 237 (Fig. 9) which leads to pump 80. Leading back to the tank 236 is a seepage, by-pass or return conduit 238 by which the hydraulic fluid is returned thereto. The pump 80, of course, produces hydraulic fluid under pressure and delivers it by way of an outlet pipe or conduit 239 to a valve assembly including a variably operable pressure relief valve 240 and a bank of four-way spool valves designated generally by the reference character 241.

As illustrated in Figs. 1 and 2 of the drawings the valves 240 and 241 are located adjacent the operator's platform 178 where the individual valves of the bank 241 may be readily operable by an operator on said platform. The detailed structure of the valves 240 and 241 as elements of the loader and the hydraulic system and the valve 241 per se are important features of my invention. The structures of the valves 240 and 241 will be described in detail hereinafter.

At the moment it is sufficient to point out in connection with Fig. 26 that there are six slide spools in the bank of valves 241. The first spool on the right hand side, as viewed in Figs. 9 and 26 controls the previously described motors or jacks 198 which are connected in parallel over obvious pipes or conduits and by shifting this spool in reverse directions from the neutral, the two motors or jacks 198 may be operated in reverse directions. When said spool is in its neutral position these two motors are locked. The second spool from the right provides equivalent control for the single double acting steering motor or jack 217. The third spool from the right in practice is employed as a three-way valve rather than a four-way valve and it controls the flow of fluid over obvious conduits to the hydraulic piston motors or jacks 144 in parallel. These are single acting rather than double acting motors, as previously described. The fourth spool from the right controls the reversely operable rotary hydraulic motor 119 which feeds the gathering head 53 by adjusting the longitudinally extensible frame 48. This is a four-way valve and conduits are provided extending from it to operate the motor 119 in reverse directions. There is also a third conduit extending from the motor 119 which is a branch of the return or relief conduit 238 and thus receives any leakage of the motor 119 and returns it to the tank 236. The fifth and sixth spools of the bank of valves 241, as viewed from the right, cooperate to provide for operation of the two hydraulic motors 134 in parallel so that said motors 134 may be operated to drive their associated wheels 130, 131 either to move the loader rectilinearly in reverse directions or, in other words, with said wheels in parallel when traveling along parallel paths or to operate said motors 134 in parallel to drive said wheels 130, 131 in tandem, in reverse directions. The particular structures of these two spools and associated passageways and conduits will be described in complete detail hereinafter.

It may also be mentioned that leading from each of the motors 134 is a branch of the return conduit 238 so as to take the leakage therefrom. The conduit 238 also extends from the left hand side of the bank of valves 241 and it may be stated that when all of the spools of this valve are in normal condition they provide a no-load by-pass so that the oil can flow freely from the pump 80 to the conduit 238 and back to the tank 236. The conduit 238 also has a branch leading directly to the variably operable pressure relief valve 240.

Attention is now directed to Figs. 25 to 32 of the drawings and to the structures of the variably operable pressure relief valve 240 and the bank of spool valves 241. It may be stated as a prelude to the detailed description of these valves that the pressure relief valve 240 acts not only as a safety valve against excess pressures in the hydraulic system but also has a very important function to adjust variably and progressively a variable characteristic of the hydraulic fluid and specifically the pressure at which said hydraulic fluid will be discharged when the system is in operation.

The parts are so arranged that by operating a single lever a selected one of the five right hand spools, as viewed in Fig. 26, may be operated first to effect a connection between the hydraulic fluid under pressure and the particular hydraulic motor or motors selected for operation. As the operating handle is further operated after the spool is adjusted the pressure of the fluid which is delivered to the selected motor is progressively increased as the handle is progressively moved beyond the initial position. This is a matter of considerable practical importance particularly in a loading machine as it is applied to operate the head feeding motor 119 or traction wheels 130, 131 or, in other words, to operate the reversible rotary hydraulic motors 134 because the pressure of the hydraulic fluid delivered to these motors determines the torque developed by them. In a loading machine as well as other mining machines and even in machines generally it is often desirable to start the traction wheels or other turning torque developing devices with a low torque and to increase the torque progressively if necessary to do the intended work. This makes for a very smooth operation together with safety and that the operator may not have excessive torque in starting the operation but if greater torque is needed than that when the operation is started it is readily available.

Referring first to the details of the bank of valves 241, as seen in Figs. 25 and 26, this bank includes a main body or casting 242 provided with six vertical bores which receive the six spools, only the last two of which will be described in detail and which are designated by the reference characters 243 and 244. As clearly illustrated in the drawings, hydraulic fluid delivered from the pressure relief valve 240 to the valve bank 241 is delivered to a central two-arm passageway 245 and with all the spools in neutral positions this passageway extends by duplicated individual steps through the main body 242 until it is dumped from the central chamber 246 adjacent the spool 243 by way of parallel passageways 247 which dump into parallel top and bottom tank or drain passageways 248, both of which are common to the tops and bottoms of all of the spools. These two passageways 248 are interconnected adjacent the right hand end of the body or casting 242 and are directly connected with the previously mentioned drain conduit or pipe 238. The bottom passageway 248 is formed in part in a removable bottom plate 249 which is removably attached as by machine screws (not shown) to the casting 242 and may be considered as forming a part of said body 242. The spool 243 extends into one of the previously mentioned bores in the casting 242 which is designated by the reference character 250. This bore is of substantially uniform diameter throughout its entire length from the top of the casting 242 into the bottom passageway 248. Cooperating with the bore 250 are top and bottom motor chambers or ports 251 and 252, respectively, which are connected with the conduits leading to the upper hydraulic motor 134, as viewed in Fig. 9 of the drawings. The bifurcated central passageway 245 associated with the bore 250 is similar in construction to all the others to the right thereof in said casting 242 and it terminates in upper and lower chambers or ports 253 and 254, respectively.

The spool 243 is provided with an upper land or barrel 255, a lower land or barrel 256 and a central or intermediate land or barrel 257, said spool 243 being of reduced diameter between land or barrel 257 and the other two lands or barrels 255 and 256, as clearly illustrated in Fig. 26 of the drawings.

The spool 244 extends into a uniform bore 258 in the casting 242 and this bore and associated ports and passageways as well as spool 244 are of different structure from the spool 243 and bore 255 which in general is substantially the same as each of the other spools and bores, respectively, of the bank of valves 241. This difference is because of an entirely different function performed by the valve 244, 258. It may be stated that the function of the valve 244, 258 is to control that portion of the hydraulic circuit individual to the two hydraulic motors 134 so that the wheels 130, 131 will rotate selectively either in parallel or, in other words, along parallel paths or in tandem for purposes previously described in complete detail.

In certain broader aspects of the invention it may be considered that the valve 244, 258 provides for the operation of the two motors 134 selectively so that they operate either in a like or similar manner or in an unlike or dissimilar manner or, in other words, so that they rotate selectively in the same directions, that is, both clockwise or both counter-clockwise or in opposite directions, that is, either one clockwise while the other one rotates counter-clockwise.

The valve 243, 250 operates in conjunction with the valve 244, 258 so that the two motors 134 considered together may be reversely operated regardless of whether the wheels are rotating in tandem or in parallel or, in other words, regardless of whether the motors are operating in a like or in an unlike manner.

Adjacent the central portion of the bore 258 is a chamber or port 259 and unlike the somewhat similar chamber or port 246 chamber 259 is connected by a pipe or conduit directly to the motor 134. In other words, it is connected to one of the two pipes at the side of lower motor 134, as viewed in Fig. 9 of the drawings. Below the chamber or port 259 is a chamber or port 260 which, of course, like chamber 259 communicates with the bore 258 and is connected by a passageway to the motor chamber or port 252 of valve 243, 250. Also communicating with the bore 258 and positioned below chamber or port 260 is a chamber or port 261 which connects with the other pipe or conduit leading to the side of the lower motor 134, as seen in Fig. 9 of the drawings. Directly above the chamber 259 is a chamber or port 262 in communication with the bore 258 which chamber 262 is connected by a passageway to the previously described motor chamber 251. Directly above the chamber 262 and communicating with the bore 258 is another motor chamber or port 263 which is connected by a passageway 264 to the previously described motor chamber 261.

The valve spool 244 has three lands or barrels including central land or barrel 265, upper land or barrel 266 and lower land or barrel 267.

The spool 243 like all of the other spools to the right of it, as viewed in Fig. 26, is a three-position spool and each of these spools is shown in its normal or neutral position which provides a no-load by-pass through passageways 245 and to the central chambers of each, similar to the central chamber 246, by virtue of the fact that the central lands or barrels similar to that at 257 of spool 243 are relatively short length and the reduced portion of each of said valve spools similar to spool 243 provides an obvious passageway between the upper and lower arms of successive passageways 245 into the successive central chambers similar to that at 246. As previously described, chamber 246 dumps directly to the tank or drain passageways 248 by way of passageways 247.

Assuming that the valve spool 244 is in the position illustrated which is one of its normal positions and the valve spool 243 is shifted upwardly the hydraulic fluid delivered to the upper arm of the associated passageway 245 will be directed by the lands 255 and 257 to the motor port 251. The hydraulic fluid under pressure will thus flow through the conduit which is connected with motor port 251 to the upper motor 134 of Fig. 9, the return fluid from said upper motor 134 returning to the lower motor port 252 which under these conditions communicates with the lower tank or drain passageway 248 by way of the lower portion of bore 250. This will, of course, cause rotation of the upper motor 134 of Fig. 9 in a predetermined direction. The pressure of this hydraulic fluid and thus the torque developed by said motor 134 may be progressively adjusted in a manner hereinafter described.

The lower hydraulic motor 134 of Fig. 9 is also connected in parallel with the upper motor 134 and the parts are so connected that with the valve spool 244 in the position illustrated, the two motors 134 will rotate their associated wheels 130, 131 along parallel paths. The hydraulic path by which these two motors 134 are connected in parallel is provided by virtue of the fact that motor port 251 is always connected to previously described port 262 associated with spool 244 and with said spool 244 in the position illustrated in Fig. 26 this hydraulic path or passageway extends from chamber 262 through bore 258 to chamber 263, then through passageway 264 to motor port 261 which is connected with one of the conduits of lower motor 134 of Fig. 9, as previously described.

The other conduit of said lower motor 134 extends as above described to its port 259 which is now connected through bore 258 to chamber 260 which is permanently connected to the motor chamber 252 which under the assumed conditions (with spool 243 lifted) is connected with lower drain or tank passageway 248, as above described. In other words, the two hydraulic motors 134 are hydraulically connected in parallel under the assumed conditions and these two motors drive their associated wheels 130, 131 along parallel paths to move the vehicle forwardly. Under such conditions, considering each of the motors individually, one of them rotates in a clockwise direction and the other in a counter-clockwise direction. In other words, they will be operating in unlike or reverse directions.

If the valve spool 243 is returned to its neutral position, as illustrated in Fig. 26, the two motors 134 will be locked against rotation in either direction. If said spool 243 is then moved downwardly the two motors 143 will reverse their directions of rotation, driving the wheels 130, 131 along parallel paths to reverse the direction of travel of the motor. It is believed the circuits created are obvious since under these conditions motor port 252 is connected to the pressure passageway 245 and motor port 251 is connected to upper drain passageway 248. If the spool 243 is moved downwardly from the position illustrated in Fig. 26, the relative direction of rotation of the two motors 134 is reversed from that just described. This is the arrangement of the valves employed when the wheels 130, 131 are swung to their tandem position and it is desired to swing the loader in either of the two reverse directions. The effect of the adjustment of the spool 243 hydraulically is to shift the previous connection of the motor chambers 251 and 261 in parallel and the motor chambers 252 and 259 in parallel to one in which a reverse direction exists and motor chamber 251 is connected in parallel with motor chamber 259 and motor chamber 252 is connected in parallel with motor chamber 261. This is effected in a manner which is believed evident in that by moving spool 244 downwardly the restricted portion between lands 255 and 257 will interconnect chambers 260 and 261 while the restricted portion between lands 265 and 266 will interconnect chambers 262 and 259.

It is, of course, obvious that when the wheels 130, 131 are in their tandem positions, as shown in Fig. 1 in dotted lines, and the valve 244 is adjusted so as to operate them in this position they may be driven in reverse directions. The two motors 134 under these conditions, while reversible together, each operate in a similar manner or in the same direction such as a clockwise direction or a counter-clockwise direction.

It is thus evident that I have produced a novel combination of valves as well as a novel hydraulic system and in addition a novel combination of parts in a loading machine or the like which provides for extreme flexibility of operation with a pair of hydraulic motors to perform different functions.

It may be further mentioned that adjacent the top of each of the spools illustrated in Fig. 26 of the drawings there is a hydraulic seal (not shown) preventing leakage of fluid from the casting 242.

Attention is now directed particularly to Figs. 25 and 27 of the drawings and to the structure of the pressure control valve 240. As illustrated in Fig. 25 of the drawings, the valve 240 is mounted on a short pipe 268 threaded into the casting 242 (Fig. 27) and directing the hydraulic fluid to the first passageway 245 (Fig. 26). This pipe 268 physically supports the valve 240 from the valve tank 241. To prevent turning movement of the valve 240 a bracket 269 has an arm which extends in front of the bottom portion of valve 240 and is attached by a pair of screws to the casting 242. Removal of the bracket 269 will permit screw threaded removal of the valve 240. Said valve 240 comprises a main body or casting 270 which is provided with a screw threaded inlet port on the right hand side, as viewed in Figs. 25 and 26, which is connected to the conduit 239 (see Fig. 9) leading from pump 89 and which communicates with a central chamber 271 formed in the casting 270. From the chamber 271 the hydraulic fluid under pressure communicates directly with the pipe 268 and is thus fed to the passageway 245. As previously mentioned, the function of the valve 240 is to control the pressure of the hydraulic fluid delivered to the hydraulic motors, or, in other words, delivered to the bank of valves 241. To this end there is an upright cylindrical bore 272 which receives a piston 273 having at its bottom an integrally formed by-pass valve cone 274 adapted to cooperate with a seat ring 275 to control the amount of fluid which is discharged from the chamber 271 through the bottom discharge chamber or port 276 which is directed to the drain pipe 238, illustrated in Fig. 9 of the drawings. The pressure of the hydraulic fluid in the chamber 271 is controlled by the size of the by-pass opening provided by the by-pass valve 274—275 and in operation the piston 273 will float under the control of the hydraulic fluid in a manner adjusted by the operator to maintain a hydraulic pressure in chamber 271 at any value from substantially zero to a very high value such as 1200 pounds per square inch or even higher, if desired. In other words, just enough hydraulic fluid is by-passed from chamber 271 to maintain any selected pressure therein and the value may be adjusted over the range indicated. This, of course, has the inherent feature of acting as a high pressure relief valve for the hydraulic system. To effect this automatic but adjustable control, the piston 273 is provided with a very small bore 277 which extends completely through it so that the hydraulic fluid under pressure in the chamber 271 will flow through the bore 277 and be present in the bore 272 above said piston 273. As a consequence the only pressure difference between the top and bottom of the piston 273 will be the pressure drop through the bore 277 which will be a function of the flow rate therethrough. The pressure in the bore 272 above the piston 273 is transferred upwardly by the hydraulic fluid through a bore 278 formed in a removable cap or head 279 attached to the casting or body 270 by machine screws (not shown). A constriction member 280 is placed in the bore 278 so that in case of a fluid flow through said bore 278 it will produce a pressure drop, dependent upon the rate of such fluid flow.

Bore 278 has a horizontal as well as a vertical portion, the horizontal portion of which provides a discharge port into a chamber 281 which is controlled by a ball 282, thus providing a ball check valve. The ball 282 is compressed by a spring 283 in a valve closing direction. The tension of spring 283 is variably adjustable by a reciprocally adjustable plunger 284 mounted in the head 279 and extending through stuffing box 285. Adjustment of the plunger 284 will adjust the tension of the spring 283 and consequently adjust the pressure necessary to unseat the ball 282 which determines the pressure of the hydraulic fluid in the main chamber 271 of the pressure control valve 240. Mechanism by which the plunger 284 is adjusted is described in detail hereinafter.

Whenever the pressure in the bore 278 is sufficient to unseat the ball 282, it is obvious that hydraulic fluid under this pressure will flow into the chamber 281. Said hydraulic fluid in chamber 281 is free to discharge into the by-pass chamber or port 276 through an open port 286 formed in the bottom of chamber 281 which communicates with a central bore 287 in the piston 273 over an obvious passageway in which is a fairly light spring 288 which urges the piston 273 downwardly and thus urges the by-pass valve 274—275 into valve closing position.

The operation of the pressure relief valve 240 is as follows: Assuming that the spring 283 is tensioned so that the ball 282 will open at a pressure of 500 pounds per square inch, as long as the pressure in chamber 271 is below 500 pounds the ball 282 will remain seated and consequently there will be no fluid flow through it into chamber 281. Because of this fact there will be no fluid flow through bores 277 or 278 or through constriction 280. Consequently the pressure on opposite sides of the piston 273 will be equalized and the spring 288 will maintain the by-pass valve 274—275 closed. Should the pressure in chamber 271 exceed 500 pounds per square inch, ball 282 will be unseated and there will be a flow of hydraulic fluid into the chamber 281 and through port 286 and bore 287 to the by-pass chamber 276. This flow of fluid will create a pressure drop through restricted bore 277 so that the pressure on the bottom thereof will be greater than the pressure on top. As a consequence the by-pass valve 274—275 will unseat in response to a lifting of the piston 273 and sufficient hydraulic fluid will be by-passed from chamber 271 to reduce the pressure therein.

Under normal operating conditions, the valve 240 will operate with the piston 273 in a floating condition by-passing just enough hydraulic fluid to maintain the preselected pressure in the main chamber 271.

It is obvious that by adjusting the plunger 284 and thus the compression of spring 283, this pressure may be varied progressively and continuously from any desired minimum to a maximum value. It is thus evident that the characteristic of the hydraulic fluid which is controlled by the valve 240 is its pressure characteristic. Within certain broad aspects of my invention some other characteristic of the hydraulic fluid such as the rate of fluid flow might be controlled by said characteristic control valve 240. However, in the instant invention since it is the torque of the motors and particularly the motors 119 and 134 which are to be controlled, it is the pressure characteristic of the hydraulic fluid which is so controlled.

As previously suggested, the operating mechanism for the first valve spools counting from the right, as viewed in Fig. 26 of the drawings, is reproduced except for certain common operating mechanism, but the operating mechanism for the spools 244 is entirely independent of the others. It will be described first and is illustrated in detail in Fig. 32 of the drawings.

Mounted on the left hand end of the casting 242, as viewed in Fig. 25, is a bifurcated bracket 289 (see Fig. 32) the two spaced arms of which extend forwardly and carry a pivot pin 290. Pivotally mounted on the pivot pin 290 is an operating handle 291 which extends forwardly and downwardly in either of its positions of adjustment and which at its upper end terminates in an arcuate plate 292. Extending to the right of the arcuate plate 292, as viewed in Fig. 32, the handle has an integral plate and arm 293 which is located inside the two arms of the bracket 289 and has a hole providing pivotal connection with the above mentioned pivot pin 290. The plate 293 carries a hardened segment 294 formed integral therewith which is provided with a pair of spaced notches adapted to receive selectively a spring pressed detent 295 carried between the spaced arms of bracket 289.

As previously mentioned, the spool 244 has only two positions and so the detent and notches in the segment 294 cooperate to locate it properly in either of these two positions. The upper arm of the plate 293 extends in a downwardly sloping direction and carries a pivot pin 296 in its forward bifurcated end which has a sliding contact with a transverse notch 297 formed in the upper end of the spool 244. It is thus manifest that up and down or swinging movement of the handle 291 will produce up and down adjustment of the piston or spool 244.

The other five sliding spools including spool 243 are provided with similar operating handles which differ materially from that just described since they are moved not only to shift the spools but to operate after the spools have been shifted from their neutral positions in either of the two reverse directions to adjust the pressure control or relief valve 240 and thus adjust the pressure of the hydraulic fluid delivered to the selected motor or motor whose control valve is actuated. The structures of these operating levers will be seen particularly by reference to Figs. 25, 27, 28, 29, 30 and 31 of the drawings.

Adjacent each spool such as spool 243 there is a bracket 298 having a pair of spaced arms, which bracket is attached by screws to the main casting 242 (see Fig. 30). Extending between the arms of said bracket 298 is a pivot pin 299 upon which is pivotally mounted an operating handle 300 by means of a pair of spaced upright webs 301 formed integral therewith and also integral with an arcuate plate 302. Also pivotally mounted on the pin 299 is a forwardly extending downwardly sloping operating lever 303 which is bifurcated at its lower end (see Fig. 30) and is provided with a cross-pin 304 which extends into an operating groove in the upper end of the associated valve spool, similar to the pin arrangement 296—297, above described in connection with the operation of Fig. 32.

As clearly seen particularly by reference to Figs. 25, 29, 30 and 31, at its left hand end the arm 303 has as an integrally formed part thereof a pair of downwardly extending laterally spaced plates or webs 305 which are also pivoted to the pin 299. Between these spaced plates 305 is a washer 306 carried on the pin 299 which acts as a spacer for a coil centering spring 307. The convolutions of spring 307 are wound around the washer 306 and the free ends thereof extend forwardly or to the right, as viewed in these figures of the drawings, the lower one, as viewed in Fig. 30 of the drawings, extending over an integral lug or abutment 308 which extends inwardly from the lower plate 305, as viewed in Fig. 30, and also over transversely extending pin 309 carried by the bracket 298 and extending between the two spaced apart arms thereof. The other or upper free end of the spring 307, as viewed in Fig. 30, extends forwardly below an integrally extending lug 310 formed on the upper plate 305 and also below the pin 309. The spring 307 is normally biased so that the free ends thereof exert opposing forces on opposite sides of the pin 309. As a consequence they tend to maintain the lever 303 in the neutral position which is illustrated in the drawings and movement thereof to either of the reverse operating positions will be counteracted by the spring 307 in an obvious manner, thus returning each of the spools in question to its normal position whenever the operating handle 300 is released.

The operating connection between the lever 303 and the handle 300 is a flexible one and provides for the progressive movement of the handle 300 in either of its reverse directions beyond that which is required to shift the spools such as spool 243. This connection includes an operating rod 311 housed within the handle 300 which is hollow, rod 311 having a head 312 on its outer end and threading into a head 313 on its inner end. The head 313 slides through an opening of an abutment ring 314 fastened to the inner walls of the opening in handle 300. Surrounding the rod 311 is a coil spring 315 normally under compression which abuts freely slidable washers 316 and 317 at its opposite ends, which washer 316 abuts a shoulder formed in the opening of handle 300 and which washer 317 abuts the ring 314. The head 313 is pivotally connected to a connecting link 318 which in turn is pivotally connected by a pivot pin 319 to the rear end of the spool operating lever 303.

During the first movement of the handle 300 from its normal position in either of its reverse directions, the spring 315 and its associated apparatus is without particular significance and the spool operating lever 303 moves as a unit with the handle 300. Further movement of the handle 300, however, in either direction will not produce any further movement of the spool operating lever 303 and this will be taken care of by compression of the spring 315 under the influence of the rod 311, the heads 312 and 313 and the washers 316 and 317, the spring 315 being compressed a progressively increasing amount as the handle is progressively moved beyond the spool acting position without regard to the direction of such movement.

As an incident to this further movement of the handle 300 in either of its reverse directions with the consequent compression of the spring 315, mechanism is brought into operation for adjusting progressively, and in accordance with the extent of movement of the handle 300, regardless of the direction of such movement, the pressure of the hydraulic fluid in the chamber 271 as determined by the pressure or relief valve 240. To this end the right hand web or plate 301 of each of the handles 300 is provided with a pair of downwardly extending radially spaced feet 320. Each pair of feet 320 straddles a roller 321 (see Figs. 25 and 27) there being five such rollers, all mounted on pivot pins on a pivoted bracket 322, the roller 321 being carried on upwardly extending bifurcated extensions 323 thereof (see Fig. 25). The bracket 322 is pivotally mounted on a pair of spaced brackets 324, (see Fig. 25) so that it can swing on a horizontal axis extending in front of the main valve assembly 241. The right hand end of the bracket 322 carries upper and lower rollers 325 which are mounted to roll on appropriate pivot pins and which abut a large head or disc 326 formed on the plunger 284.

The initial operation of the handle 300 to adjust the associated spool such as spool 243 does not produce any swinging movement of the bracket 322 since the feet 320 are radially spaced to provide for an abutting contact which takes place only following such valve spool shifting adjustment. Further movement, however, of the handle 300 in either direction will cause one of the legs 320 to abut the associated roller 321 and pivot the bracket 322 about its horizontal axis. This will cause one of the rollers 325 to move inwardly against the head 326 since one of them is above the axis of the pivotal bracket 322 and the other is equally spaced below it, thus forcing the plunger 284 inwardly from the position illustrated in Fig. 27 which is the position of minimum hydraulic pressure for the system. This minimum pressure may be selected at any desired value, as for example 50 pounds per square inch, and may be adjusted progressively in infinite steps upon progressive movement of the handle 300 until a desired maximum pressure is reached which, purely for illustration, may be 1200 lbs. per square inch. It is thus obvious that when a selected spool, such as spool 243, is thrown from its neutral position to start rotation of the hydraulic motors, such as the motors 134, it will first start under a minimum predetermined torque which is determined by the pressure of the hydraulic fluid delivered thereto. If the operator desires to increase the torque he merely pushes further on the handle 300 and this is true whether he lifts it or pushes down on it or, in other words, regardless of the direction of operation of the hydraulic motors 134. Thus the operator can progressively increase the torque from the minimum starting value to any value within the range of the system.

In addition to the structure already described it will be noted by reference to Figs. 1 and 2 of the drawings that just forwardly of the steering wheel assembly 184 there is an electrical control box 327 which is attached to the main frame 40 and provides a housing for the electrical equipment such as relays, resistors, etc., associated with the motor 75. The operation of the loader and associated apparatus will be understood by a description of certain typical operations, some of which are illustrated in particular in Figs. 33 and 36 of the drawings.

Considering first, however, the loader as an independent unit, entirely separated from the conveyor 63, it will be transported under its own power with the parts substantially in the positions illustrated in Figs. 1 and 2 of the drawings, except for the presence of the receiving conveyor 63.

During transportation the gathering head 53 will be elevated slightly as compared with the illustration in Fig. 2 of the drawings so as to clear the mine floor. The loader or vehicle will be driven much in the fashion of an automobile, mine shuttle car or the like, by an operator who can sit on the platform 178 in a semi-reclined position. The electric motor 75 will supply the primary source of power on the loader and it in turn derives power from an electrical system over an extensible cable, not shown, the cable leading to a control box 327, by applying power to the two traction wheel assemblies 128 and 129 in a manner previously described. When they are in their parallel positions, as illustrated in full lines in Figs. 1 and 2 of the drawings, it is obvious that the vehicle may be driven from place to place in reverse directions, if necessary, the steering being effected by the dirigible type steering wheel assemblies 183 and 184.

Assuming that the loader has reached a position in a mine room where coal has been undercut and shot or is otherwise prepared to be loaded out, the two hydraulic jacks 198 associated with steering wheel assemblies 183 and 184 will be expanded and if necessary the hydraulic jacks 144 (Fig. 3) associated with the traction wheel assemblies 128 and 129 will also be expanded so as to elevate the ball 222 so that it may be guided into the socket 223. When the ball 222 and socket 223 are connected, the hydraulic jacks 198 are contracted to lift the wheel assemblies 183 and 184 off the mine floor. Under these conditions the loader will be connected at its discharge end by the ball and socket connection 222, 223 to the associated receiving conveyor 63 or other equivalent apparatus including that previously described in connection with Figs. 35 and 36.

As previously mentioned, the socket 223 is anchored against movement by one or more roof jacks. In the combination of Figs. 33 and 34 this is effected by a single roof jack connected to receiving conveyor 63. In the combination of Figs. 35 and 36 two roof jacks 230 are employed. With the discharge end of the loader thus pivotally connected at a fixed position the latching mechanism described in Figs. 4, 5 and 6 of the drawings is released and the motors 134 operated so that they tend to drive the wheels 130, 131 forwardly. However, since the wheel assemblies 128 and 129 are free to swing about their upright axes, one on each side of the main frame 40 and conveyor 47, they will swing inwardly to the dotted line positions illustrated in Fig. 1 of the drawings and thus assume a tandem relation. Under these conditions the axis of rotation of the two wheels 130, 131 will not be exactly parallel but they will intersect on approximately the vertical axes of the ball 222 so that they will tend to drive the loader through a circular or swinging motion in a horizontal plane, the center of which is the ball 222. With the parts thus adjusted, the latch mechanism will lock the wheels in their tandem relation. The spool 244 will then be actuated by its operating handle 291 so as to reverse the connections of one of the motors 134 with respect to the other, as previously described, so that when these motors are thereafter actuated by spool 243 selectively in reverse directions they will both tend to rotate in the same direction and thus operate to swing the motor as above described. With the loader and associated receiving conveyor 63 thus assembled and adjusted for operation, the operator can swing the gathering head 53 to any desired position and feed it longitudinally by operating the feeding motor 119 which is controlled by one of the valves of the valve assembly 241. This feeding operation is, of course, effected while both the gathering conveyors 70 and the main or discharge conveyor 47 are in operation under the driving influence of the electric motor 75 as controlled by clutch 87. During this gathering operation the gathering flights 74 will extend both forwardly and laterally beyond the gathering plate 52 to dig into and gather the loose coal as well as break down semi-compact coal. The operator will continue his combination rectilinearly and swinging feeding of the gathering head 53 by the combined action of swinging the entire loader about the ball 222 and feeding the head 53 rectilinearly until he has loaded out all of the loose or semi-compact coal.

It is obvious that in view of the combined swinging movement of the loader and the rectilinear feeding of the gathering head 53 a wide area may be covered in which the coal is gathered. During this gathering operation the forces exerted by the head 53 to feed it into the loose or semi-compact coal may be adjusted between wide limits, first of all because of the fact that the discharge end of the loader is anchored, thus providing an anchorage or abutment against which it can push. In the second place the pushing force or torque developed by the rotary motor 119 which feeds the extensible frame 48 and thus the gathering head 53 may be adjusted starting from a minimum setting up to a maximum setting, as determined by the variable pressure in the hydraulic system under the control of valve 240, as previously described. In other words, this variable torque or variable force feature provided by adjusting the pressure of the hydraulic fluid is useful not only in connection with the driving wheels 128 and 129 but also in connection with the extension of the supplemental frame 48. In this connection it may be further stated that the loader may be operated without being pivotally connected at ball 222 if it is not necessary that the discharge point be maintained fixed. In other words, coal can be loaded by feeding the entire unit into a pile of loose or semi-compact coal and this can be supplemented by feeding the rectilinearly adjustable supplemental frame 48 also while the loader is unanchored or not connected with the receiving conveyor 63.

In Fig. 34 of the drawings an illustration of the great flexibility of the loader is indicated where it is shown as loading out a diagonal break-through in a mine rib. This illustrates particularly the great range of rectilinear adjustment of the head 53 with respect to the main frame 40.

The operations illustrated in Figs. 35 and 36 are quite similar to that of Fig. 34 except that the right angle break-through is shown in a mine rib. The dotted line illustration of the machine loading out the corners of the mine room are also seen in Fig. 35. As previously described, in Figs. 35 and 36 of the drawings the loader is discharging over the side of the receiving conveyor 63 and is pivotally connected and supported to mechanism including a pair of spaced jacks 230 which were previously described in more complete detail.

Returning to a consideration of the showings in Figs. 1 and 2 of the drawings, certain additional important characteristics are to be noted. First of all it is to be noted that the machine has a generally uniform overall height and by removing the headlight 235 the overall height is reduced to a minimum which may be, for example, approximately 2 ft. It is to be particularly noted that the main conveyor 47 extends longitudinally and rectilinearly between the two pair of wheel assemblies including the traction wheel assemblies 128 and 129 and the steering wheel assemblies 183 and 184. Furthermore, it is to be noted that the overall height of the main frame 40 is less than the height or diameter of the wheels 130, 131. In other words, the limiting factor on the height of this machine is the diameter of the traction wheels. It is thus obvious that I have provided a very compact loader capable of self-transportation and self-loading, yet one which has a very high capacity since the coal or other material is gathered by direct, positive, mechanically operated gathering mechanism 70, 70 and is conveyed rearwardly to the receiving receptacle or receiving conveyor 63 by a direct continuously moving conveyor 47 which in the specific embodiment of my invention is a chain and flight scraper type. This combination of high capacity gathering mechanism and high capacity conveyor mechanism makes for a machine of a very high capacity for the overall dimensions thereof. It also makes for a machine which is particularly adapted for use in very low seam coal though, of course, the machine may be used in high seam coal.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a loading machine, the combination with a main frame, of an elongated substantially horizontal telescoping conveyor including endless traveling conveyor mechanism mounted thereon and extending substantially the full length of said machine, said conveyor having a gathering head at the front end carrying laterally spaced coal gathering means for gathering coal and delivering it to said conveyor and having a reciprocable head shaft carried by said gathering head, traction means for supporting said main frame, means for anchoring the rear discharge end of said conveyor while providing for its pivotal movement together with said traction means in a horizontal plane, and means for feeding said gathering head and said conveyor head shaft rectilinearly while said gathering means are in operation to gather coal by frontal attack while it is discharged at a selected fixed position at the rear end of said machine.

2. In a loading machine, the combination with an elongated telescopic frame, of an elongated conveyor including endless traveling conveyor mechanism mounted thereon and head and tail shafts adjacent opposite ends of said machine over which said endless conveyor mechanism travels, said frame having a gathering head carrying said head shaft and also carrying means for gathering coal and delivering it to said conveyor, means for anchoring the discharge end of said conveyor near said tail shaft while providing for its pivotal movement in a horizontal plane, and means for feeding said gathering head rectilinearly while said gathering means are in operation to gather coal by frontal attack while it is discharged at a selected fixed position.

3. In a loading machine, the combination with a telescopic frame, of an elongated conveyor including endless traveling conveyor mechanism mounted thereon and having head and tail shafts at opposite ends thereon, said frame having a gathering head carrying said head shaft and carrying means operable thereby for gathering coal and delivering it to said conveyor, means for anchoring the discharge end of said conveyor near said tail shaft, and means for feeding said gathering head rectilinearly while said gathering means are in operation to gather coal by frontal attack while it is discharged at a selected fixed position.

4. In a loader, the combination with a frame, of an elongated conveyor on said frame, a pair of power operated traction wheels for supporting and propelling said frame, a pair of steerable wheels for supporting and steering said frame, means for lifting said steering wheels, means for supporting one end of said frame for swinging movement in a horizontal plane while said steering wheels are lifted, and means mounting said traction wheels whereby they may be pivoted so that when so pivoted the traction wheels may be operated to swing said loader in a horizontal plane.

5. In a loader, the combination with a frame, conveying mechanism on said frame, a pair of traction wheels, one on each side of said conveyor, power means for driving said traction wheels, means mounting said traction wheels for swinging movement about upright axes, means for swinging said wheels simultaneously oppositely and for locking said wheels while parallel and also while angularly disposed, said means including operating levers one connected to each wheel, a member pivoted to said frame, pivotal connections between said levers and said member on opposite sides of the pivotal connection of said member, and releasable means for latching said member.

6. In a loader, the combination with a frame, conveying mechanism on said frame, a pair of traction wheels, one on each side of said conveyor, power means for driving said traction means, means mounting said traction wheels for simultaneous opposite swinging movement about upright axes, means for locking said wheels while parallel and also while angularly disposed, said means connecting both wheels so they swing simultaneously about their upright axes.

7. A loader including an elongated substantially horizontally extending telescoping two part frame of low overall height having a gathering head at one end and on the front part thereof, traveling conveyor means extending throughout the major length of said frame including a head shaft carried by said head and a tail shaft at the opposite end thereof and carried by the rear part, laterally spaced power driven gathering means on said head adapted to gather coal by positive action and deliver it to said traveling conveyor by which it is moved rearwardly and discharged over said tail shaft from the rear of said frame, traction and steering means including pairs of front and rear wheels connected to said telescoping frame and operable to transport said frame from place to place, means for pivotally mounting the loader including said traction and steering means for pivotal swinging movement in a substantially horizontal plane about an upright axis adjacent its rear end, power operated means for swinging said loader about said upright axis, and power operated means for reciprocating said gathering head and said front conveyor part together with said head shaft to force said head into coal while said coal is gathered by said laterally spaced gathering means.

8. A loader including an elongated substantially horizontally extending telescoping two part frame of low overall height having a gathering head at one end and on the front part thereof, traveling conveyor means extending throughout the major length of said frame including a head shaft carried by said head and a tail shaft at the opposite end thereof and carried by the rear part, laterally spaced power driven gathering means on said head adapted to gather coal by positive action and deliver it to said traveling conveyor by which it is moved rearwardly and discharged over said tail shaft from the rear of said frame, traction and steering means connected to said telescoping frame and operable to transport said frame from place to place, means for pivotally mounting the loader including said traction and steering means for pivotal swinging movement in a substantially horizontal plane about an upright axis adjacent its rear end, power operated means for swinging said loader about said upright axis, and power operated means for reciprocating said gathering head and said front conveyor part together with said head shaft to force said head into coal while said coal is gathered by said laterally spaced gathering means.

9. An underground coal loading machine including an elongated frame having chain conveyor mechanism extending from one end to the other thereof adapted to receive coal at its front end and discharge it from its rear end, means pivotally supporting the rear end of said frame for swinging movement in a horizontal plane and operable to resist feeding thrusts on said frame, a gathering head mounted on the front end of said frame and including laterally spaced gathering means operable to gather coal and deliver it to said conveyor, means for feeding said head forwardly to feed it into coal, the thrusts thereof being transferred through said frame to said pivot means, longitudinally spaced pairs of traction and steering wheels for supporting said frame, means for adjusting said traction wheels to swing said frame about said rear end pivot, and means for lifting said steering wheels to provide for said swinging of said frame.

10. In a loading apparatus, the combination with a frame, of a pair of front ground engaging frame supporting wheels and rear ground engaging frame supporting wheel means, mechanism providing reverse adjustments of said front wheels on upright axis, mechanism for pivotally supporting the rear end of the frame for swinging movements horizontally, and means for lifting the rear wheel means off the ground to facilitate such horizontal swinging of the loading machine on the upright axis of said pivotal mechanism.

11. In a loading machine, the combination with supporting framework, of a conveyor carried thereby, gathering means for said conveyor, a pair of front wheels each adjustable on a vertical axis, a pair of rear wheels co-acting with said front wheels to support said framework, means providing for pivotal support of said conveyor adjacent its discharge end, means for lifting the rear wheels when said conveyor is pivotally supported adjacent its discharge end, and means for adjusting the front wheels on said vertical axes from positions directing longitudinal movement of the machine to transverse positions directing swinging of the machine about said pivotal support.

12. In loading apparatus, the combination with a loading machine supported on two pairs of ground engaging wheels, of mechanism affording adjustments of the wheels of one pair on vertical axes from longitudinal to transverse positions relative to the body of the loading machine, mechanism affording adjustment in elevation of the other pair of wheels, and a pivotal support for one end of the loading machine to provide for swinging of the machine on said pivotal support when the first-named wheels are transverse and the second-named wheels are in elevated positions.

13. In loading apparatus, the combination with a frame, of a pair of arcuately aligned front wheels adapted to support said frame and swing it about its rear end, a pair of rear ground engaging frame supporting steering wheels, mechanism for pivotally supporting the rear end of the frame for swinging movements horizontally, and means for lifting the rear wheels off the ground to facilitate horizontal swinging of the frame as aforesaid.

14. In loading apparatus, the combination with a frame, of a pair of arcuately aligned front wheels adapted to support said frame and swing it about its rear end, a pair of rear ground engaging frame supporting wheels, mechanism for pivotally supporting the rear end of the frame for swinging movements horizontally, and means for lifting the rear wheels off the ground to facilitate horizontal swinging of the frame as aforesaid.

15. A loader including an elongated frame, traction wheels adjacent one end of said frame, means mounting said wheels whereby they are operable to move it rectilinearly or to swing it about a pivot, means providing a pivotal mounting for the other end of said frame, steering wheels for said vehicle operable to steer it when transported and said pivotal mounting is inoperative, and means for vertically adjusting said steering wheels relative to said frame whereby they may be raised off the ground when said pivotal mounting means is operative.

ARTHUR L. LEE.

REFERENCES CITED

The following references are of record in the file of this patent:

UNITED STATES PATENTS

| Number | Name | Date |
|---|---|---|
| 428,749 | Frank | May 27, 1890 |
| 550,152 | Barr | Nov. 19, 1895 |
| 570,876 | Le Grand | Nov. 3, 1896 |
| 642,175 | Titus | Jan. 30, 1900 |
| 754,546 | Deady | Mar. 15, 1904 |
| 804,525 | Ericsson | Nov. 14, 1905 |
| 806,803 | Hamilton | Dec. 12, 1905 |
| 895,457 | Hawley | Aug. 11, 1908 |
| 980,645 | Koch | Jan. 3, 1911 |
| 1,128,880 | Jamison | Feb. 16, 1915 |
| 1,271,627 | Stuart | July 9, 1918 |
| 1,290,200 | Holmested | Jan. 7, 1919 |
| 1,306,064 | Joy | June 10, 1919 |
| 1,449,088 | Burnell | Mar. 20, 1923 |
| 1,518,797 | Kay | Dec. 9, 1924 |
| 1,586,573 | Newdick | June 1, 1926 |
| 1,589,091 | Barber | June 15, 1926 |
| 1,621,211 | Lewis | Mar. 15, 1927 |
| 1,691,732 | Nickels | Nov. 13, 1928 |
| 1,710,129 | Whitnall | Apr. 23, 1929 |
| 1,716,732 | Mossay | June 11, 1929 |
| 1,758,198 | Morgan | May 13, 1930 |
| 1,773,587 | Lake | Aug. 19, 1930 |
| 1,810,119 | Bebinger | June 16, 1931 |
| 1,814,635 | Schlundt | July 14, 1931 |
| 1,997,247 | Cartlidge | Apr. 9, 1935 |
| 2,002,199 | Cartlidge | May 21, 1935 |
| 2,025,257 | Vaughen | Dec. 24, 1935 |
| 2,059,205 | Buffington | Nov. 3, 1936 |
| 2,060,220 | Kennedy | Nov. 10, 1936 |
| 2,204,882 | Berluti | June 18, 1940 |
| 2,227,762 | Ronning | Jan. 7, 1941 |
| 2,235,595 | Stein | Mar. 18, 1941 |
| 2,251,667 | Ehinger | Aug. 5, 1941 |
| 2,254,181 | Joy | Aug. 26, 1941 |
| 2,265,519 | Crawford | Dec. 9, 1941 |
| 2,282,704 | Butters | May 12, 1942 |
| 2,298,448 | Arentzen | Oct. 13, 1942 |
| 2,326,857 | Holstein | Aug. 17, 1943 |
| 2,332,546 | Arentzen | Oct. 26, 1943 |
| 2,353,730 | Joy | July 18, 1944 |
| 2,360,282 | Russell | Oct. 10, 1944 |
| 2,384,083 | Doberstein | Sept. 4, 1945 |

FOREIGN PATENTS

| Number | Country | Date |
|---|---|---|
| 390,901 | Great Britain | Apr. 20, 1933 |
| 490,066 | Great Britain | Aug. 9, 1938 |